United States Patent
Kawahara et al.

(10) Patent No.: US 8,415,061 B2
(45) Date of Patent: Apr. 9, 2013

(54) FUEL CELL SYSTEM AND CONTROL METHOD OF SAME

(75) Inventors: Shuya Kawahara, Susono (JP); Manabu Kato, Susono (JP); Hideyuki Kumei, Shizuoka-ken (JP); Tomoaki Uchiyama, Shizuoka-ken (JP); Tsuyoshi Maruo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/510,436

(22) PCT Filed: Nov. 25, 2010

(86) PCT No.: PCT/IB2010/003007
§ 371 (c)(1),
(2), (4) Date: Aug. 20, 2012

(87) PCT Pub. No.: WO2011/064649
PCT Pub. Date: Jun. 3, 2011

(65) Prior Publication Data
US 2012/0308905 A1    Dec. 6, 2012

(30) Foreign Application Priority Data
Nov. 26, 2009 (JP) ................ 2009-268246

(51) Int. Cl.
H01M 8/06 (2006.01)
H01M 8/04 (2006.01)
(52) U.S. Cl.
USPC ............ 429/414; 429/429; 429/431; 429/430
(58) Field of Classification Search .................. 429/414, 429/429, 431, 430
See application file for complete search history.

(56) References Cited

U.S. PATENT DOCUMENTS
2004/0161657 A1    8/2004   Simpson et al.

FOREIGN PATENT DOCUMENTS
| EP | 0 948 069 A2 | 10/1999 |
| EP | 1 513 209 A2 | 3/2005 |
| JP | A-2007-035516 | 2/2007 |
| JP | A-2008-140734 | 6/2008 |
| JP | A-2009-043520 | 2/2009 |

OTHER PUBLICATIONS

Yan et al., "Transient analysis of water transport in PEM fuel cells," Journal of Power Sources, vol. 162; No. 2, pp. 1147-1156, 2006.
Kraytsberg et al., "PEM FC with improved water management," Journal of Power Sources, vol. 160, No. 1, pp. 194-201, 2006.

(Continued)

Primary Examiner — Helen O Conley
(74) Attorney, Agent, or Firm — Oliff & Berridge, PLC

(57) ABSTRACT

A fuel cell system includes a fuel cell; a cathode inflow water amount determining portion that determines a cathode inflow water amount after activation of the fuel cell; an obtaining portion that obtains a pore total volume of the cathode side catalyst layer; an operating condition determining portion that determines, based on the determined cathode inflow water amount and the obtained pore total volume, an operating condition of the fuel cell that includes a current value of current that flows through the fuel cell and an upper limit value of a period of time for which the current flows, for bringing the cathode inflow water amount within a range that is equal to or less than the pore total volume; and an adjusting portion that adjusts the current value and the period of time for which current of the current value flows, such that the determined operating condition is realized.

11 Claims, 14 Drawing Sheets

OTHER PUBLICATIONS

Gerteisen et al., "Modeling the phenomena of dehydration and flooding of a polymer electrolyte membrane fuel cell," *Journal of Power Sources*, vol. 187, No. 1, pp. 165-181, 2009.

Mao et al., "A Multiphase Model for Cold Start of Polymer Electrolyte Fuel Cells," *Journal of the Electrochemical Society*, vol. 154, No. 3, pp. B341-B351, 2007.

Aotani et al., "An Analysis of the Water Transport Properties of Polymer Electrolyte Membrane," *ECS Transactions*, vol. 16, No. 2, pp. 341-352, 2008.

Ge et al., "Experimental Determination of Electro-Osmotic Drag Coefficient in Nafion Membrane for Fuel Cells, " *Journal of The Electrochemical Society*, vol. 153, No. 8, pp. A1443-A1450, 2006

Written Opinion of the International Preliminary Examining Authority issued in Application No. PCT/IB2010/003007; Dated Nov. 25, 2011.

Written Opinion of the International Searching Authority issued in Application No. PCT/IB2010/003007; Dated May 19, 2011.

International Search Report issued in Application No. PCT/IB2010/003007; Dated May 19, 2011.

<MEMBRANE WATER CONTENT TABLE>

<DIFFUSION COEFFICIENT TABLE>

<ELECTRO-OSMOTIC COEFFICIENT TABLE>

SECOND EXAMPLE EMBODIMENT

THIRD EXAMPLE EMBODIMENT

<CATHODE INFLOW WATER AMOUNT TABLE>

THIRD EXAMPLE EMBODIMENT

<MEMBRANE WATER CONTENT TABLE>

FIFTH MODIFIED EXAMPLE (FIRST EXAMPLE)

FIFTH MODIFIED EXAMPLE (SECOND EXAMPLE)

FUEL CELL SYSTEM AND CONTROL METHOD OF SAME

BACKGROUND OF THE INVENTION

1. Field of the Invention

The invention relates to a fuel cell system provided with a fuel cell and a control method of the same.

2. Description of the Related Art

One known fuel cell has a structure in which an electrolyte membrane is sandwiched between a catalyst layer of one electrode (i.e., a cathode) and a catalyst layer of another electrode (i.e., an anode), and this structure is then sandwiched between a gas diffusion layer of the one electrode and a gas diffusion layer of the other electrode. If this fuel cell is stopped under a temperature condition of below freezing, water remaining in the fuel cell (i.e., in the gas diffusion layer, and in between the catalyst layer and the gas diffusion layer) may freeze. If the fuel cell is then activated while residual water is frozen, the supply of reaction gas to the electrolyte membrane may be inhibited. Therefore, Japanese Patent Application Publication No. 2008-140734 (JP-A-2008-140734) proposes a fuel cell system that scavenges residual water according to the temperature of the fuel cell. Also, with such a structure that scavenges residual water, there is a possibility that the performance of the fuel cell may decline due to too much moisture being removed. Therefore, Japanese Patent Application Publication No. 2007-35516 (JP-A-2007-35516) proposes a fuel cell system that estimates the dry state of the electrolyte membrane based on a voltage value of the fuel cell, and inhibits the voltage of the fuel cell from falling to 0 V or below by suppressing output current when the electrolyte membrane is dry.

If the fuel cell is activated while residual water on the cathode side is frozen, the supply of reaction gas (such as air) on the cathode side to the electrolyte membrane may be inhibited. Therefore, on the cathode side, a reduction reaction of hydrogen ions (hereinafter also referred to as "protons") takes place instead of a water-forming reaction that takes place when generating power normally. When the consumption of protons progresses due to this reduction reaction, protons travel from the anode side to the cathode side via the electrolyte membrane. At this time, a large amount of water travels to the cathode side with the movement of protons.

Here, because water in the gas diffusion layer and in between the catalyst layer and the gas diffusion layer is frozen, water that has traveled to the cathode side with the movement of protons (i.e., electro-osmotic water) is not discharged outside through the gas diffusion layer, but instead accumulates in the catalyst layer and freezes. Typically, the catalyst layer has many pores and the electro-osmotic water accumulates in these pores. The amount of electro-osmotic water that flows gradually increases, and when it reaches an amount that exceeds the total volume of the pores in the cathode side catalyst layer, the electro-osmotic water accumulates between the electrolyte membrane and the cathode side catalyst layer and freezes. As a result, the catalyst layer on the cathode side separates from the electrolyte membrane, damaging the fuel cell.

However, in the past there has simply not been sufficient innovation with respect to this kind of problem. For example, in a structure that scavenges residual water, such as the structure described above, the problem described above may occur if scavenging is insufficient and residual water remains. Also, with a structure that estimates the dry state based on the voltage value of the fuel cell and suppresses output current when the electrolyte membrane is dry, the dry state of the electrolyte membrane is only estimated, so the existence of residual water cannot be accurately detected. As a result, not only may the problem described above occur, but output may be unnecessarily restricted.

DISCLOSURE OF THE INVENTION

The invention inhibits separation of the catalyst layer from the electrolyte membrane due to water freezing in the fuel cell.

A first aspect of the invention relates to a fuel cell system that includes a fuel cell that has an electrolyte membrane, and a cathode side catalyst layer and an anode side catalyst layer that have a plurality of pores and are arranged contacting the electrolyte membrane; a cathode inflow water amount determining portion that determines a cathode inflow water amount that is an amount of water produced with power generation of the fuel cell that flows into the cathode side catalyst layer via the electrolyte membrane after activation of the fuel cell; a pore volume obtaining portion that obtains a pore total volume that is a volume of the plurality of pores in the cathode side catalyst layer; an operating condition determining portion that determines, based on the determined cathode inflow water amount and the obtained pore total volume, an operating condition of the fuel cell that includes a current value of current that flows through the fuel cell and an upper limit value of a period of time for which the current flows through the fuel cell, for bringing the cathode inflow water amount within a range that is equal to or less than the pore total volume; and a current adjusting portion that adjusts the current value and the period of time for which current of the current value flows, such that the determined operating condition is realized.

The operating condition (i.e., the current value of current that flows through the fuel cell and the upper limit value of the period of time for which current flows through the fuel cell) of the fuel cell for bringing the cathode inflow water amount within a range of equal to or less than the volume of the plurality of pores in the cathode side catalyst layer is determined, and the current value and the period of time for which current flows are adjusted such that the determined operating condition is realized. As a result, the cathode inflow water amount can be made to be equal to or less than the pore total volume. Therefore, it is possible to suppress water of an amount that is larger than the volume of the pores from flowing into the cathode side catalyst layer. As a result, it is possible to inhibit the cathode side catalyst layer from separating from the electrolyte membrane due to the freezing of accumulated water.

A gas that includes hydrogen may be supplied as an anode side reaction gas to the fuel cell, and the cathode inflow water amount determining portion may include an electro-osmotic water amount determining portion that determines an electro-osmotic water amount that is an amount of water that moves from an anode side to a cathode side through the electrolyte membrane with the movement of hydrogen ions from the anode side to the cathode side of the electrolyte membrane, that flows into the cathode side catalyst layer after activation of the fuel cell, and a back-diffusion water amount determining portion that determines a back-diffusion water amount that is an amount of water that moves from the cathode side to the anode side through the electrolyte membrane according to a water concentration difference between the cathode side catalyst layer and the anode side catalyst layer, and that flows out from the cathode side catalyst layer after activation of the fuel cell. Also, the cathode inflow water amount determining portion may determine the cathode inflow water amount by subtracting the back-diffusion water amount from the electro-osmotic water amount.

According to this kind of structure, both the electro-osmotic water amount and the back-diffusion water amount that are water amounts that determine the cathode inflow water amount are determined, and the cathode inflow water amount is determined using these water amounts. As a result, the cathode inflow water amount can be accurately obtained.

The electro-osmotic water amount determining portion may determine the electro-osmotic water amount using expression 1.

$$Qe = i/F * \beta * t \quad \text{(expression 1)}$$

In expression 1, Qe represents an electro-osmotic water amount, i represents a current density, F represents a Faraday constant, $\beta$ represents an electro-osmotic coefficient, and t represents a period of time after activation.

According to this kind of structure, the electro-osmotic water amount can be determined by obtaining the current density and the electro-osmotic coefficient and inserting these values into the expression. As a result, the electro-osmotic water amount can be accurately determined in a short period of time.

The cathode side catalyst layer may have an ionomer including a sulfonic acid group, and the back-diffusion water amount determining portion may obtain the water concentration difference between the cathode side catalyst layer and the anode side catalyst layer by obtaining a water concentration of the cathode side catalyst layer and a water concentration of the anode side catalyst layer using expression 2, and determine the back-diffusion water amount using expression 3.

$$Cw = \epsilon * \rho * \lambda / EW \quad \text{(expression 2)}$$

In expression 2, Cw represents a water concentration, $\epsilon$ represents a volume fraction of an ionomer, $\rho$ represents an ionomer density, $\lambda$ represents a membrane water content, and EW represents an acid group density.

$$Qi = D * \Delta C / \Delta mt * t \quad \text{(expression 3)}$$

In expression 3, Qi represents a back-diffusion water amount, D represents a self-diffusion coefficient, $\Delta C$ represents a water concentration difference, $\Delta mt$ represents a thickness of an electrolyte membrane, and t represents a period of time after activation.

According to this kind of structure, the back-diffusion water amount can be determined by inserting the values of the obtained parameters into the expression, so the back-diffusion water amount can be accurately determined in a short period of time. Incidentally, the ionomer volume fraction ($\epsilon$) represents the volume of the ionomer per unit volume of each catalyst layer, i.e., the cathode side catalyst layer and the anode side catalyst layer; the ionomer density ($\rho$) represents the weight of the ionomer per unit volume of each catalyst layer, i.e., the cathode side catalyst layer and the anode side catalyst layer; the membrane water content ($\lambda$) represents the number of water molecules able to be retained by one sulfonic acid group of the ionomer in each catalyst layer, i.e., the cathode side catalyst layer and the anode side catalyst layer; the acid group density (EW) represents the density in the ionomer of a side chain having a sulfonic acid group of the ionomer of each catalyst layer, i.e., the cathode side catalyst layer and the anode side catalyst layer; the self-diffusion coefficient (D) represents a self-diffusion coefficient of water of the electrolyte membrane; and the thickness ($\Delta mt$) of the electrolyte membrane represents the thickness (i.e., the length) of the electrolyte membrane in the direction in which the electrolyte membrane contacts the cathode side catalyst layer and the anode side catalyst layer.

The fuel cell system described above may also include a storing portion that stores a preset value as the membrane water content ($\lambda$) of the cathode side catalyst layer and a preset value as the membrane water content ($\lambda$) of the anode side catalyst layer.

According to this kind of structure, the membrane water content ($\lambda$) of both the cathode side catalyst layer and the anode side catalyst layer can be obtained in a short period of time by the storing portion. Also, the processing load for determining the back-diffusion water amount is able to be reduced.

The fuel cell described above may also include a current value measuring portion that measures the current value, and a time measuring portion that measures a period of time that passes after activation of the fuel cell. Also, the current adjusting portion may decrease the current value before the measured period of time that passes reaches the upper limit value of the operating condition that corresponds to the measured current value.

According to this kind of structure, the current value is decreased before the upper limit value is reached, so the electro-osmotic water amount can be decreased before the upper limit value is reached. Therefore, it is possible to inhibit the cathode inflow water amount from exceeding the volume of the pores, as well as extend the upper limit value until the cathode inflow water amount reaches the volume of the pores.

The operating condition may be an operating condition in which the cathode inflow water amount is equal to or less than 0.

According to this kind of structure, the current value and the period of time for which current flows are adjusted such that the cathode inflow water amount becomes equal to or less than 0, i.e., such that the electro-osmotic water amount becomes equal to or less than the back-diffusion water amount. Therefore, it is possible to reliably inhibit the cathode inflow water amount from becoming greater than the pore volume.

The fuel cell system described above may also include a temperature obtaining portion that obtains a temperature of the fuel cell. Also, the current adjusting portion may adjust the current value and the period of time for which the current flows, such that the determined operating condition is realized, when the obtained temperature is below 0° C.

According to this kind of structure, the current value and the period of time for which current flows can be adjusted such that the determined condition is realized, only when the water that flows into the cathode (i.e., the cathode inflow water) will not be discharged from the cathode side catalyst layer due to the temperature of the fuel cell being below 0° C. and the residual water freezing. Therefore, when the temperature of the fuel cell is equal to or above 0° C., this kind of adjustment does not have to be performed, so the power generation performance of the fuel cell can be improved.

The fuel cell system described above may also include a blocked state detecting portion that detects whether the fuel cell is in a blocked state in which the fuel cell is unable to generate power. Also, the current adjusting portion may adjust the current value and the period of time for which the current flows, such that the determined operating condition is realized, when it is detected that the fuel cell is in the blocked state.

According to this kind of structure, the current value and the period of time for which currents flows can be adjusted such that the determined condition is realized, only when it is highly likely that the fuel cell is in a blocked state in which reaction gas is not supplied to the cathode side catalyst layer due to the freezing of residual water. Therefore, if the fuel cell is not in a blocked state, this kind of . adjustment can be omitted, so the power generation performance of the fuel cell can be improved.

The fuel cell system may also include a voltage measuring portion that measures a voltage in the fuel cell. Also, the blocked state detecting portion may detect that the fuel cell is in a blocked state when the measured voltage is below 0 V.

According to this kind of structure, a blocked state of a fuel cell can be reliably detected.

The fuel cell system described above may also include a voltage value comparing portion that compares a first voltage value that is a voltage value of a first fuel cell group made up of a plurality of the fuel cells with a second voltage value that is a voltage value of a second fuel cell group that is made up of the same number of the fuel cells as the first fuel cell group. Also, the blocked state detecting portion may detect that one of the fuel cells of the first fuel cell group is in the blocked state when the first voltage value is lower than the second voltage value.

According to this kind of structure, it is possible to detect whether there is a fuel cell in a blocked state in a short period of time without having to determine whether each of the fuel cells is in blocked state.

A second aspect of the invention relates to a control method for a fuel cell system that includes a fuel cell that has an electrolyte membrane, and a cathode side catalyst layer and an anode side catalyst layer that have a plurality of pores and are arranged contacting the electrolyte membrane. This control method includes determining a cathode inflow water amount that is an amount of water produced with power generation of the fuel cell that flows into the cathode side catalyst layer via the electrolyte membrane after activation of the fuel cell; obtaining a pore total volume that is a volume of the plurality of pores in the cathode side catalyst layer; determining, based on the determined cathode inflow water amount and the obtained pore total volume, an operating condition of the fuel cell that includes a current value of current that flows through the fuel cell and an upper limit value of a period of time for which the current flows through the fuel cell, for bringing the cathode inflow water amount within a range that is equal to or less than the pore total volume; and adjusting the current value and the period of time for which current of the current value flows, such that the determined operating condition is realized.

With this control method, the operating condition (i.e., the current value of current that flows through the fuel cell and the upper limit value of the period of time for which current flows through the fuel cell) of the fuel cell for bringing the cathode inflow water amount within a range of equal to or less than the volume of the plurality of pores in the cathode side catalyst layer is determined, and the current value and the period of time for which current flows are adjusted such that the determined operating condition is realized. As a result, the cathode inflow water amount can be made to be equal to or less than the pore total volume. Therefore, it is possible to suppress water of an amount that is larger than the volume of the pores from flowing into the cathode side catalyst layer. As a result, it is possible to inhibit the cathode side catalyst layer from separating from the electrolyte membrane due to the freezing of accumulated water.

A third aspect of the invention relates to a fuel cell system that includes a fuel cell that has an electrolyte membrane, and a cathode side catalyst layer and an anode side catalyst layer that have a plurality of pores and are arranged contacting the electrolyte membrane; a cathode inflow water amount determining portion that determines a cathode inflow water amount that is an amount of water produced with power generation of the fuel cell that flows into the cathode side catalyst layer via the electrolyte membrane after activation of the fuel cell; an operating condition determining portion that determines, based on the determined cathode inflow water amount and a pore total volume that is a volume of the plurality of pores in the cathode side catalyst layer, an operating condition of the fuel cell that includes a current value of current that flows through the fuel cell and an upper limit value of a period of time for which the current flows through the fuel cell, for bringing the cathode inflow water amount within a range that is equal to or less than the pore total volume; and a current adjusting portion that adjusts the current value and the period of time for which current of the current value flows, such that the determined operating condition is realized.

A fourth aspect of the invention relates to a control method for a fuel cell system that includes a fuel cell that has an electrolyte membrane, and a cathode side catalyst layer and an anode side catalyst layer that have a plurality of pores and are arranged contacting the electrolyte membrane. This control method includes determining a cathode inflow water amount that is an amount of water produced with power generation of the fuel cell that flows into the cathode side catalyst layer via the electrolyte membrane after activation of the fuel cell; determining, based on the determined cathode inflow water amount and a pore total volume that is a volume of the plurality of pores in the cathode side catalyst layer, an operating condition of the fuel cell that includes a current value of current that flows through the fuel cell and an upper limit value of a period of time for which the current flows through the fuel cell, for bringing the cathode inflow water amount within a range that is equal to or less than the pore total volume; and adjusting the current value and the period of time for which current of the current value flows, such that the determined operating condition is realized.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

A. First Example Embodiment
A1. System structure

Figure 1:
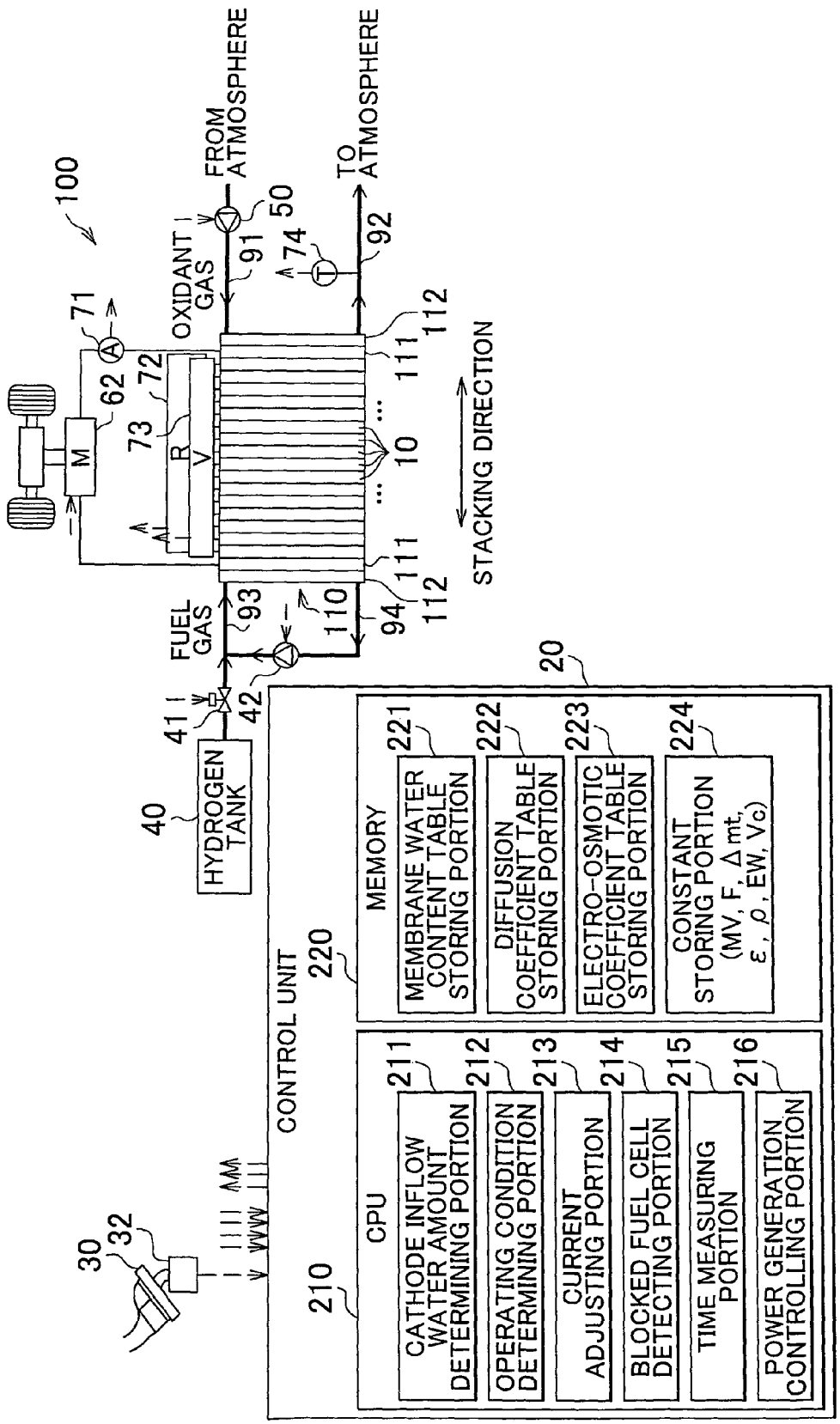
FIG. 1 is a diagram of the general structure of a fuel cell system according to a first example embodiment of the invention.

FIG. 1 is a diagram of the general structure of a fuel cell system according to a first example embodiment of the invention. In this example embodiment, the fuel cell system 100 is used mounted in an electric vehicle, as a system for supplying driving power. The fuel cell system 100 includes a fuel cell stack 110, a hydrogen tank 40, an electromagnetic valve 41, a circulation pump 42, a fuel gas supply line 93, a fuel gas discharge line 94, an air compressor 50, an oxidant gas supply line 91, an oxidant gas discharge line 92, a current measuring portion 71, an impedance measuring portion 72, a voltage measuring portion 73, a temperature measuring portion 74, and a control unit 20.

The fuel cell stack 110 includes a plurality of stacked fuel cells 10, two terminal plates 111, and two end plates 112. The two terminal plates 111 are both electrodes of the overall fuel cell stack 110, with one terminal plate 111 being an anode and the other being a cathode, that are arranged sandwiching the stacked fuel cells 10. The two terminal plates 111 are electrically connected to a driving motor 62 that serves as a load. The two end plates 112 are arranged sandwiching the two terminal plates 111. The two end plates 112 are connected together by tension plates, not shown, such that the fuel cells 10 are firmly held by a predetermined compression force in the stacking direction.

Figure 2:
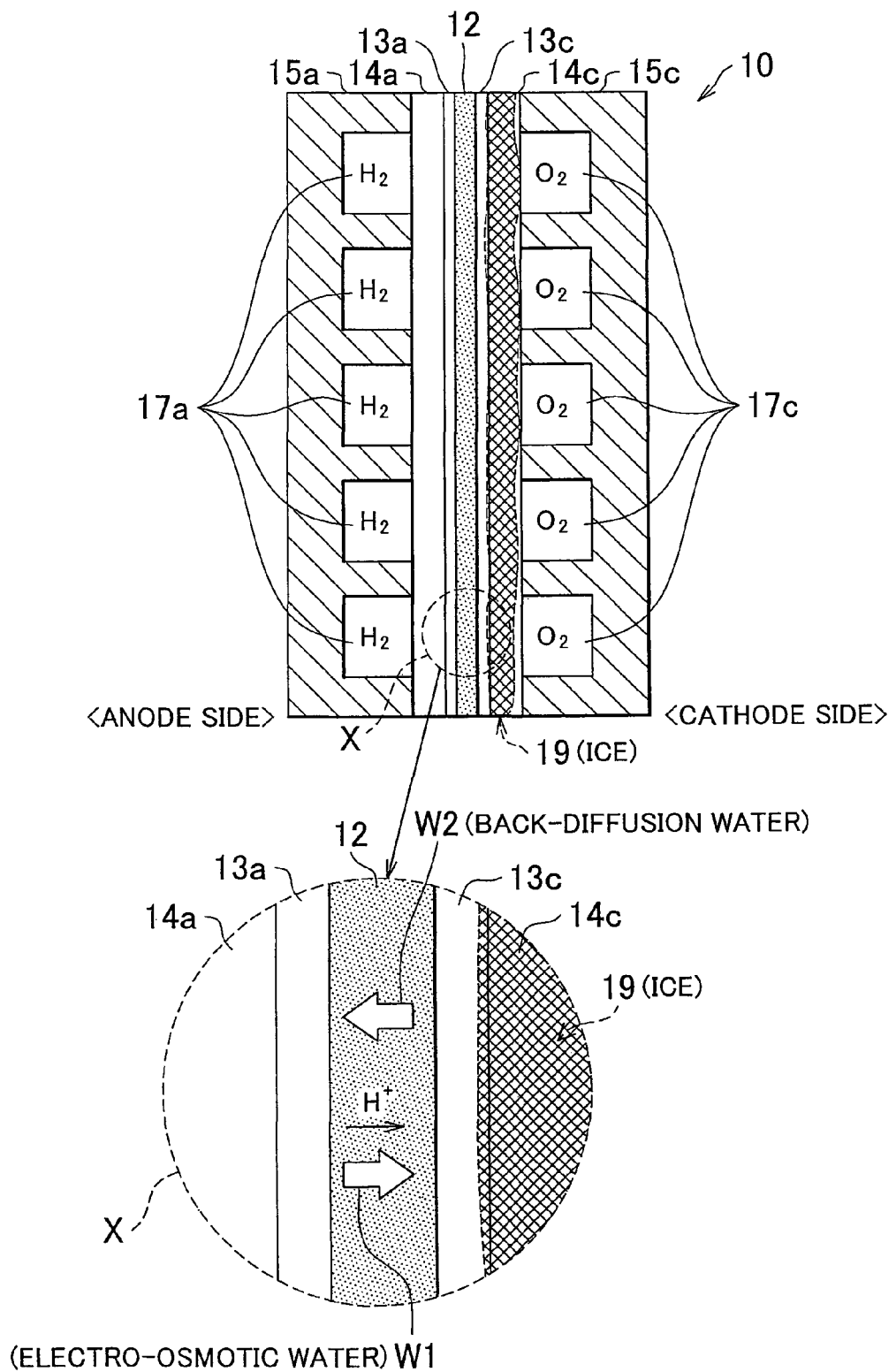
FIG. 2 is a sectional view of the detailed structure of a fuel cell shown in FIG. 1.

FIG. 2 is a sectional view of the detailed structure of one of the fuel cells 10 shown in FIG. 1. As shown in the upper part of FIG. 2, the fuel cell 10 includes an electrolyte membrane 12, a cathode side catalyst layer 13c, a cathode side gas diffusion layer 14c, a cathode side separator 15c, an anode side catalyst layer 13a, an anode side gas diffusion layer 14a, and an anode side separator 15a. Incidentally, the lower part of FIG. 2 shows an enlarged view of region X in the upper part of FIG. 2. The enlarged view will be described later.

The electrolyte membrane 12 is a sulfonic acid group-containing fluororesin ion-exchange membrane. Flemion (registered trademark) or Aciplex (registered trademark) or the like may be used. Incidentally, the electrolyte membrane 12 is not limited to including a sulfonic acid group. That is, a membrane that includes another ion-exchange group such as a phosphate group or a carboxylic group may also be used.

The cathode side catalyst layer 13c is arranged adjacent to the electrolyte membrane 12. The cathode side catalyst layer 13c is formed using a member in which a catalyst is carried on conducting particles, and an ionomer that is a proton conductor. Platinum, or an alloy of platinum and a metal such as ruthenium or iron, for example, may be used as the catalyst. Carbon particles such as carbon black, or carbon fiber or the like, for example, may be used as the conducting particles. A sulfonic acid group-containing fluororesin may be used as the ionomer. The ionomer binds together the conducting particles that carry the catalyst. The cathode side catalyst layer 13c has multiple pores, not shown. These pores are spaces formed between secondary particles (cluster-like particles in which a plurality of primary particles are grouped together) of conducting particles that carry the catalyst.

The cathode side gas diffusion layer 14c is formed by a porous member for diffusing air that is the reaction gas, and discharging water produced by electrochemical reaction and the like. More specifically, the cathode side gas diffusion layer 14c is formed by a carbon porous body such as carbon paper or carbon cross, or a metal porous body such as metal mesh or foam metal, for example.

The cathode side separator 15c may be formed by a gas impermeable conductive member, for example, dense carbon in which the carbon has been compressed so as to be gas impermeable, or press-formed metal sheet. The cathode side separator 15c has a concavo-convex shape, and oxidant gas flow paths 17c are formed between the cathode side separator 15c and the cathode side gas diffusion layer 14c by the cathode side separator 15c contacting the cathode side gas diffusion layer 14c. These oxidant gas flow paths 17c lead air supplied from the air compressor 50 to the cathode side gas diffusion layer 14c, and discharge gas (i.e., excess air and water vapor) that is discharged from the cathode side gas diffusion layer 14c to outside the fuel cell 10.

The structure of the anode side is similar to the structure of the cathode side. That is, the anode side catalyst layer 13a has the same structure as the cathode side catalyst layer 13c, the anode side gas diffusion layer 14a has the same structure as the cathode side gas diffusion layer 14c, and the anode side separator 15a has the same structure as the cathode side separator 15c. Incidentally, fuel gas flow paths 17a formed between the anode side separator 15a and the anode side gas diffusion layer 14a lead hydrogen gas supplied by the hydrogen tank 40 and the circulation pump 42 to the anode side gas diffusion layer 14a, and discharge gas (excess hydrogen gas) that is discharged from the anode side gas diffusion layer 14a to the fuel gas discharge line 94.

When the fuel cell system 100 is stopped in a low temperature environment, water remaining in the fuel cell 10 may freeze, forming ice, as shown in FIG. 2. In the example in FIG. 2, a layer of ice 19 is formed in the cathode side gas diffusion layer 14c and near the boundary between the cathode side gas diffusion layer 14c and the cathode side catalyst layer 13c. Ice tends to form on the cathode side because water is produced with the electrochemical reaction.

The hydrogen tank 40 shown in FIG. 1 stores high-pressure hydrogen gas. This hydrogen gas is supplied to the fuel cell stack 110 via the fuel gas supply line 93. The electromagnetic valve 41 is arranged in the fuel gas supply line 93 and regulates the amount of hydrogen gas that is supplied to the fuel cell stack 110. The circulation pump 42 is arranged in the fuel gas discharge line 94, and circulates the hydrogen gas that has been discharged from the fuel cell stack 110 to the fuel gas supply line 93 through the fuel gas discharge line 94. The air compressor 50 supplies compressed air (i.e., the oxidant gas) to the fuel cell stack 110 via the oxidant gas supply line 91. The air that has been discharged from the fuel cell stack 110 is released into the atmosphere via the oxidant gas discharge line 92.

The current measuring portion 71 is arranged between the fuel cell stack 110 and the motor 62 and measures the current flowing through the fuel cell system 100. The impedance measuring portion 72 is connected to each fuel cell 10 and measures the resistance value (i.e., the membrane resistance value) of the electrolyte membrane, that will be described later, that makes up part of each fuel cell 10. An alternating-current (AC) impedance method, for example, may be used as the method for measuring the resistance. The voltage measuring portion 73 is connected to each fuel cell 10 and measures the voltage of each fuel cell 10. The temperature measuring portion 74 is arranged in the oxidant gas discharge line 92 and measures the temperature of the discharged oxidant gas (i.e., the air). Incidentally, in the fuel cell system 100, the temperature of the exhaust gas is used as the temperature of the inside of the fuel cell stack 110.

The control unit 20 is connected to the electromagnetic valve 41, the circulation pump 42, and the air compressor 50, and controls each of these elements. Also, the control unit 20 is connected to the current measuring portion 71, the impedance measuring portion 72, the voltage measuring portion 73, and the temperature measuring portion 74, and obtains the measurement values obtained at each of these measuring portions 71 to 74. Also, the control unit 20 is connected to an accelerator position sensor 32 and detects the depression amount of an accelerator pedal 30.

The control unit 20 includes a CPU (Central Processing Unit) 210 and memory 220. Control programs, not shown, for controlling the fuel cell system 100 are stored in the memory 220. The CPU 210 functions as a cathode inflow water amount determining portion 211, an operating condition determining portion 212, a current adjusting portion 213, a blocked fuel cell detecting portion 214, a time measuring portion 215, and a power generation controlling portion 216 by executing these control programs.

The cathode inflow water amount determining portion 211 determines the amount of water that flows into the cathode side catalyst layer 13c in a startup routine that will be described later. The operating condition determining portion 212 determines the operating conditions (i.e., the current value of current that flows through the fuel cell system 100 and the time for which the current flows) in the startup routine that will be described later. The current adjusting portion 213 determines a current value (i.e., a required current value) of current that should flow through the fuel cell system 100 (i.e., the fuel cell stack 110), based on the depression amount of the accelerator pedal 30 and the like. The blocked fuel cell detecting portion 214 detects a fuel cell, from among the plurality of fuel cells 10, that is in a state in which power is unable to be generated due to the freezing of residual water (hereinafter this state will simply be referred to as a "blocked state"). The time measuring portion 215 has a timer, not shown, and measures the period of time that has passed after the fuel cell system 100 starts. The power generation controlling portion 216 controls the amount of power generated in the fuel cell stack 110 to realize the determined required current value. More specifically, the power generation controlling portion 216 controls the amount of power generated in the fuel cell stack 110 by controlling the amount of reaction gas (i.e., hydrogen gas and air) that is supplied, which is accomplished by controlling the electromagnetic valve 41 and the air compressor 50.

The memory 220 includes a membrane water content table storing portion 221, a diffusion coefficient table storing portion 222, an electro-osmotic coefficient table storing portion 223, and a constant storing portion 224. A membrane water content table is stored in the membrane water content table storing portion 221 in advance. Similarly, a diffusion coefficient table is stored in the diffusion coefficient table storing portion 222 in advance, an electro-osmotic coefficient table is stored in the electro-osmotic coefficient table storing portion 223 in advance, and a predetermined constant is stored in the constant storing portion 224 in advance.

Figure 3:
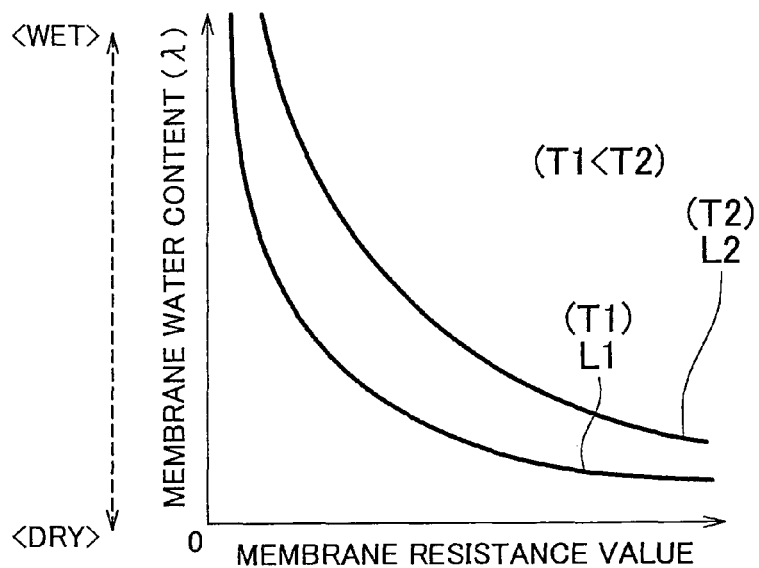
FIG. 3 is a view showing a frame format of a membrane water content table stored in a membrane water content table storing portion in FIG. 1.

FIG. 3 is a view showing a frame format of the membrane water content table stored in the membrane water content table storing portion 221 in FIG. 1. In FIG. 3, the horizontal axis represents the membrane resistance value and the vertical axis represents the membrane water content ($\lambda$). The membrane water content table is a table that correlates the membrane water content with the membrane resistance value of the fuel cell 10. In this example embodiment, a plurality of tables corresponding to different temperatures of the fuel cell stack 110 are stored as membrane water content tables in the membrane water content table storing portion 221 in advance. FIG. 3 shows a representative example of two tables L1 and L2 corresponding to two temperatures T1 and T2 (T1<T2).

The membrane resistance value refers to the resistance value of the electrolyte membrane 12 that forms part of each fuel cell 10. The membrane water content refers to the average number of water molecules able to be retained by one sulfonic acid group in the ionomer. Typically, the membrane water content is small when the electrolyte membrane 12 is dry and large when the electrolyte membrane 12 is wet.

As shown in FIG. 3, in each membrane water content table, a smaller membrane water content is set for a larger membrane resistance value. Also, in table L2 that corresponds to a high temperature, a larger value than that in table L1 that corresponds to a low temperature is set as the membrane water content ($\lambda$) that corresponds to the same membrane resistance value. Incidentally, in FIG. 3, tables L1 and L2 are shown representatively as curves (with continuous values being set), but they may also be set to discrete values. A corresponding relationship between the membrane resistance value and the membrane water content may be set by testing in advance, or set based on a well-known relational expression between the membrane resistance value and the membrane water content. The relational expression described in the Journal of The Electrochemical Society (JES), Vol. 154 B341 (2007), for example, may be used as this well-known relational expression.

Figure 4:
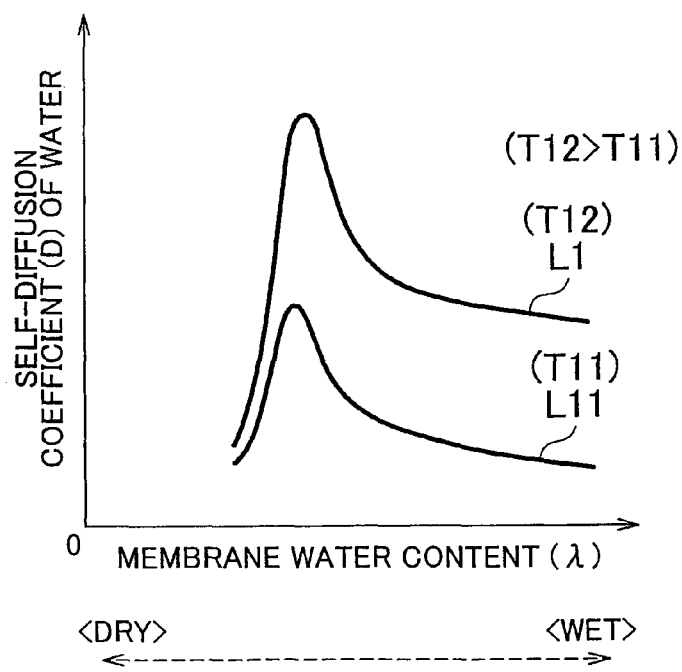
FIG. 4 is a view showing a frame format of a diffusion coefficient table stored in a diffusion coefficient table storing portion in FIG. 1.

FIG. 4 is a view showing a frame format of the diffusion coefficient table stored in the diffusion coefficient table storing portion 222 in FIG. 1. In FIG. 4, the horizontal axis represents the membrane water content ($\lambda$) and the vertical axis represents the self-diffusion coefficient (D) of water in the electrolyte membrane 12. The diffusion coefficient table is a table that correlates the membrane water content ($\lambda$) with the self-diffusion coefficient (D) of water in the electrolyte membrane 12. In this example embodiment, a plurality of tables corresponding to different temperatures of the fuel cell stack 110 are stored as diffusion coefficient tables in the diffusion coefficient table storing portion 222 in advance. FIG. 4 shows a representative example of two tables L11 and L12 corresponding to two temperatures T11 and T12 (T11<T12). Incidentally, the self-diffusion coefficient (D) represents the ease of diffusion of a medium (i.e., water) in a medium (i.e., the electrolyte membrane 12). Water diffuses more easily in the electrolyte membrane 12 as the self-diffusion coefficient (D) increases. Incidentally, in FIG. 4, tables L11 and L12 are shown representatively as curves (with continuous values being set), but they may also be set to discrete values. A corresponding relationship between the membrane water content ($\lambda$) and the self-diffusion coefficient (D) may be set by testing in advance, or set based on well-known test results. The test results described in ECS Transactions (ECST), Vol. 16 341pp (2008), for example, may be used as the well-known test results.

Figure 5:
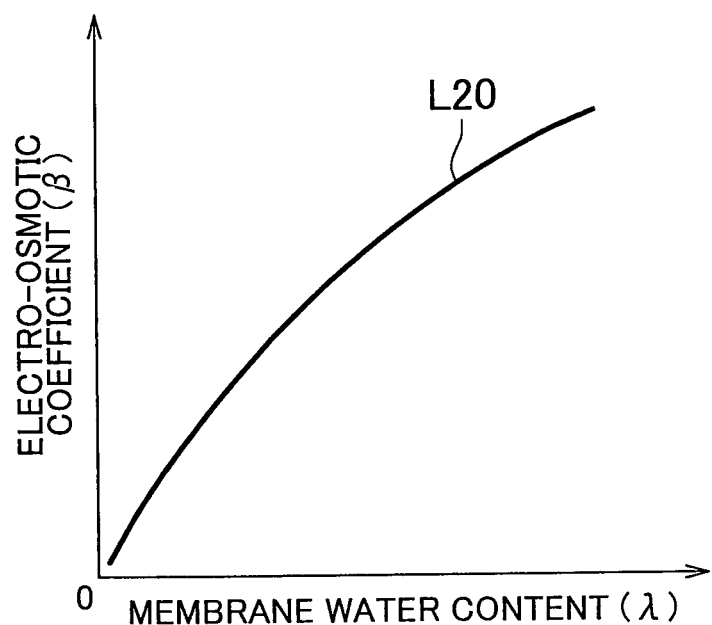
FIG. 5 is a view showing a frame format of an electro-osmotic coefficient table stored in an electro-osmotic coefficient storing portion in FIG. 1.

FIG. 5 is a view showing a frame format of the electro-osmotic coefficient table stored in the electro-osmotic coefficient storing portion 223 shown in FIG. 1. In FIG. 5, the horizontal axis represents the membrane water content ($\lambda$) and the vertical axis represents the electro-osmotic coefficient. An electro-osmotic coefficient table L20 is a table that correlates the membrane water content ($\lambda$) with the electro-osmotic coefficient ($\beta$). The electro-osmotic coefficient represents the ease with which water moves with the movement of ions (i.e. protons) through the ion-exchange membrane (i.e., the electrolyte membrane 12). The electro-osmotic coefficient table L20 shows that more water moves as the electro-osmotic coefficient ($\beta$) increases. Therefore, more water moves as the membrane water content ($\lambda$) increases, as shown in FIG. 5. Incidentally, in FIG. 5, the electro-osmotic coefficient table L20 is shown representatively as a curve (with continuous values being set), but it may also be set to discrete values. A corresponding relationship between the membrane water content ($\lambda$) and the electro-osmotic coefficient ($\beta$) may be set by testing in advance, or set based on well-known test results. The test results described in the Journal of The Electrochemical Society (JES), Vol. 153A1443 (2006), for example, may be used as the test results.

As shown in the lower part of FIG. 2, when the fuel cell system 100 is activated while the layer of ice 19 is formed in the cathode side gas diffusion layer 14c and the boundary portion between the cathode side catalyst layer 13c and the cathode side gas diffusion layer 14c, the supply of air to the electrolyte membrane 12 is inhibited. As a result, a proton reduction reaction shown in Expression 5, instead of the water-forming reaction shown in Expression 4, takes place on the cathode side.

$$O_2 + 4H^+ + 4e^- \rightarrow 2H_2O \quad \text{(Expression 4)}$$

$$2H^+ + 2e^- \rightarrow H_2 \quad \text{(Expression 5)}$$

When the consumption of protons progresses due to this reduction reaction, protons move from the anode to the cathode in the electrolyte membrane 12. At this time, the protons move to the cathode side together with the water in the electrolyte membrane 12. The water that moves from the anode side to the cathode side with this movement of protons will be referred to as electro-osmotic water W1.

When the cathode side becomes wet by the electro-osmotic water W1, a difference occurs between the cathode side water partial pressure and the anode side water partial pressure, such that water moves from the cathode side to the anode side because of this water partial pressure difference. Incidentally, the water that moves from the cathode side to the anode side due to this water partial pressure difference between electrodes will be referred to as back-diffusion water W2. The amount of water that flows into the cathode side catalyst layer 13c from the electrolyte membrane 12 (hereinafter referred to as the "cathode inflow water amount") is able to be determined by the amount of electro-osmotic water W1 and the amount of back-diffusion water W2 described above. More specifically, the cathode inflow water amount is the amount obtained by subtracting the amount of back-diffusion water W2 from the amount of electro-osmotic water W1.

By having the structure described above and executing the startup routine that will be described later, the fuel cell system 100 is able to inhibit the electrolyte membrane 12 from separating from the cathode side catalyst layer 13c, even if the fuel cell system 100 is started up (i.e., activated) while residual water on the cathode side of each fuel cell 10 (i.e., in the cathode side gas diffusion layer 14c, and at the boundary portion between the cathode side gas diffusion layer 14c and the cathode side catalyst layer 13c) is frozen.

The operating condition determining portion 212 may be regarded as the pore volume obtaining portion, the operating condition determining portion, the electro-osmotic water amount determining portion, and the back-diffusion water amount determining portion of the invention. Also, the memory 220 may be regarded as the storing portion of the invention, and the impedance measuring portion 72 may be regarded as the blocked state detecting portion of the invention.

A2. Startup routine

Figure 6:
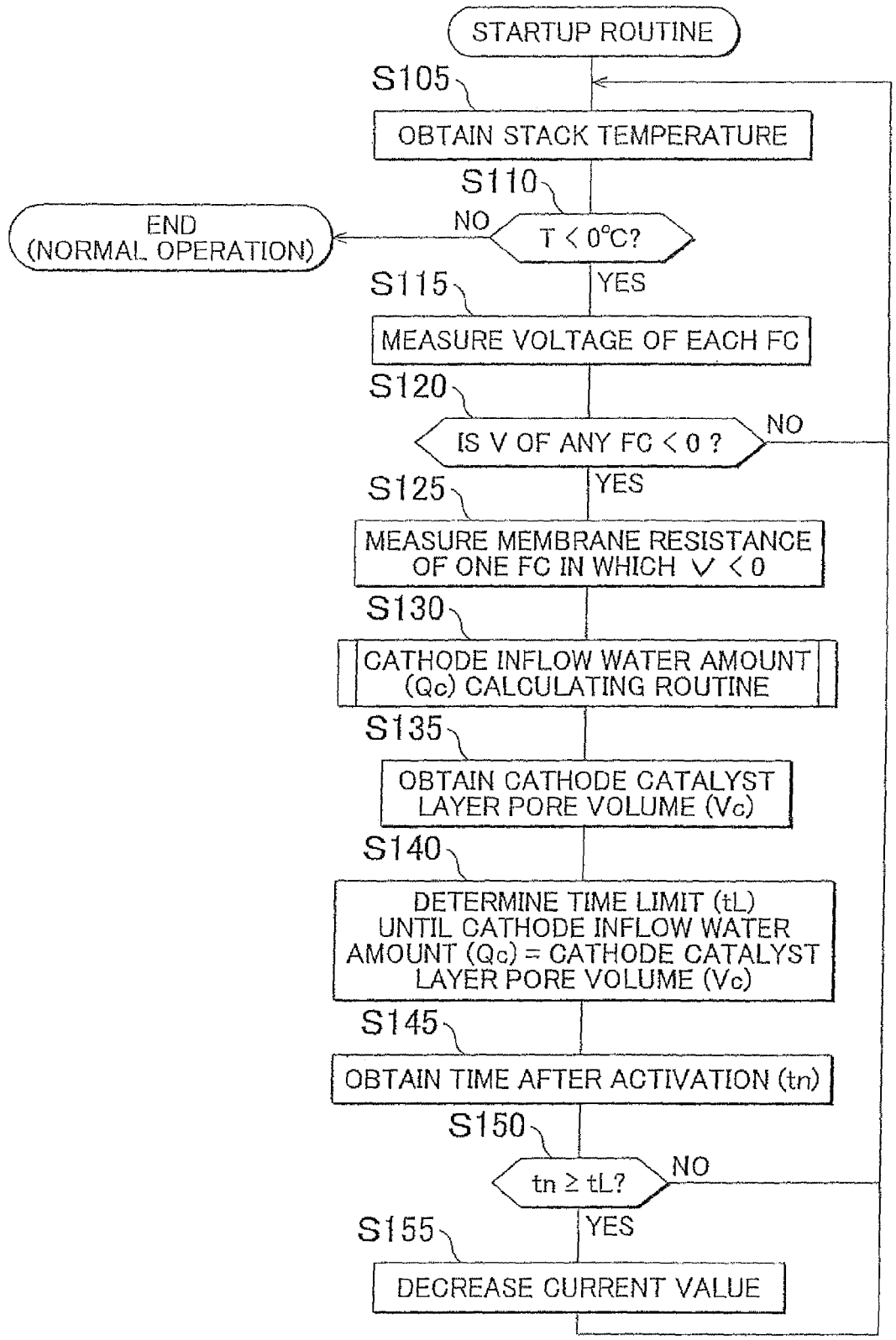
FIG. 6 is a flowchart illustrating a startup routine executed in the fuel cell system.

FIG. 6 is a flowchart illustrating the startup routine executed in the fuel cell system 100. When the ignition of an electric vehicle, not shown, is turned on, the startup routine starts in the fuel cell system 100.

The operating condition determining portion 212 shown in FIG. 1 obtains the temperature (T) of the fuel cell stack 110 from the temperature measuring portion 74 (step S105), and determines whether this temperature (T) is below 0° C. (step S110). If the temperature (T) of the fuel cell stack 110 is equal to or above 0° C., the startup routine ends and normal operation is performed, i.e., power is generated in the fuel cell stack 110 according to the required current value.

If the temperature (T) is below 0° C. in step S110 described above, the voltage measuring portion 73 measures the voltage of each fuel cell 10 and notifies the operating condition determining portion 212 (step S115). The operating condition determining portion 212 determines whether the voltage in any of the fuel cells 10 is a value lower than 0 (step S120). If the voltage in any of the fuel cells 10 is a value lower than 0, it is thought that the fuel cell 10 is in a blocked state (i.e., in a state in which power is not being generated normally because oxidant gas (i.e., air) is not being supplied due to frozen residual water). Therefore, in step S120, it is determined whether any of the fuel cells 10 is in a blocked state by determining whether the voltage in any of the fuel cells 10 is lower than 0 V. If none of the fuel cells 10 are in a blocked state (i.e., if the voltage is equal to or greater than 0 in all of the fuel cells 10), the process returns to step S105 described above.

If, on the other hand, it is determined that there are fuel cells 10 in which the voltage is lower than 0 (i.e., in a blocked state) in step S120 above, the impedance measuring portion 72 measures the membrane resistance in one of the fuel cells 10 in which the voltage is lower than 0 (step S125). The first fuel cell 10 in which the voltage is measured to be lower than 0, when the voltages of the fuel cells 10 are measured in a predetermined order in step S115, may be used as the one fuel cell 10 in which the membrane resistance is to be measured, for example. Also, as for the predetermined order, measuring may be started from the fuel cell 10 located in the center or from the last fuel cell 10, for example.

When the membrane resistance of the fuel cell 10 is measured, a cathode inflow water amount (Qc) calculating routine is executed for the fuel cell 10 in which the membrane resistance value is measured in step S125, and the cathode inflow water amount is calculated (step S130).

Figure 7:
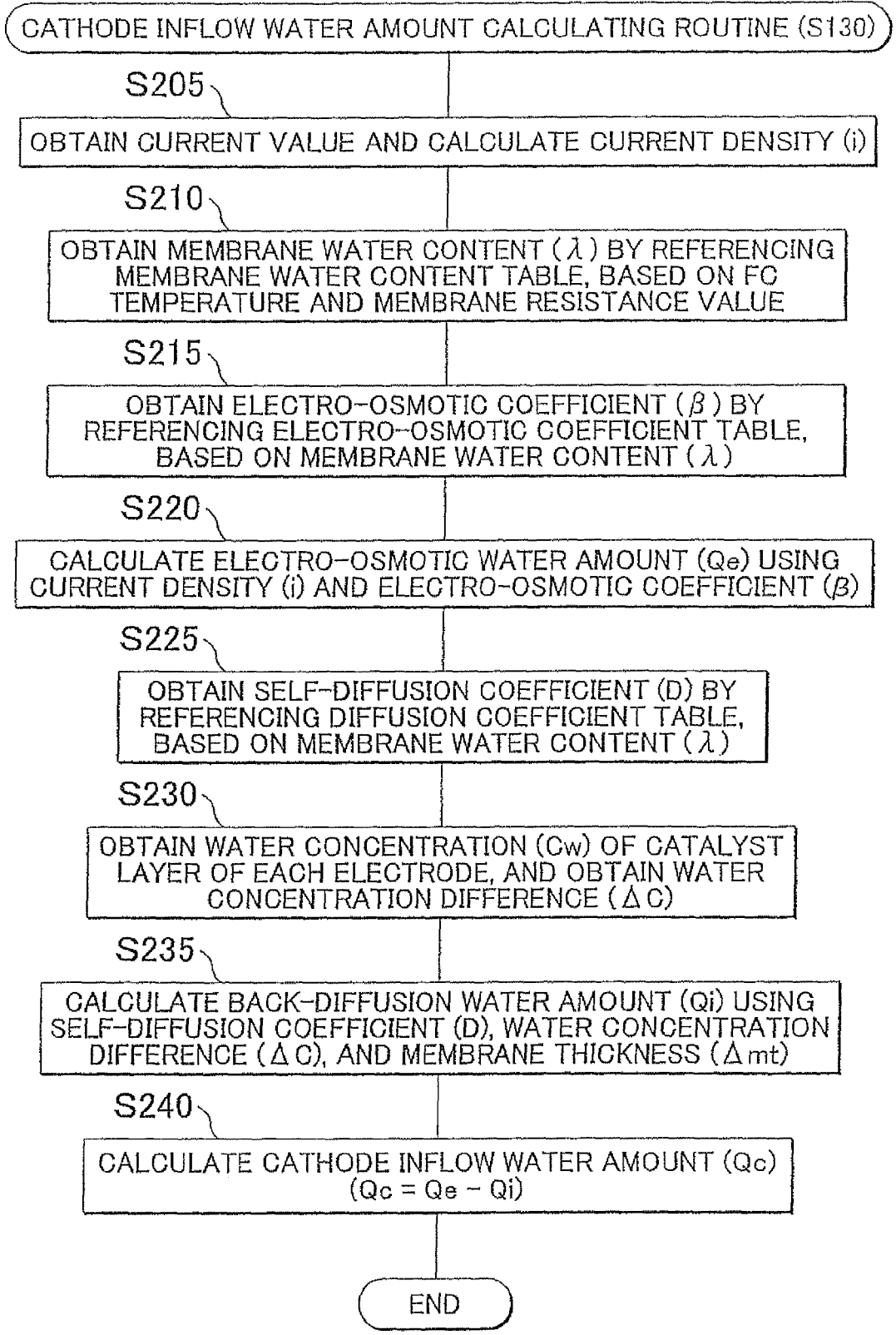
FIG. 7 is a flowchart illustrating a cathode inflow water amount calculating routine of the first example embodiment.

FIG. 7 is a flowchart illustrating the cathode inflow water amount calculating routine in the first example embodiment. The cathode inflow water amount determining portion 211 calculates the current density based on the current value measured by the current measuring portion 71 (step S205). The current density may be calculated by dividing the measured current value by the area of the laminating surface (i.e., stacking surface) of the electrolyte membrane 12. Incidentally, the area value of the electrolyte membrane 12 in the stacking direction may be stored in the constant storing portion 224 in advance.

The cathode inflow water amount determining portion 211 references the membrane water content table and obtains the membrane water content (λ) based on the temperature (T) of the fuel cell stack 110 measured in step S105 and the membrane resistance value measured in step S125 (step S210). As shown in FIG. 3, the table that is referenced is set based on the temperature (T) of the fuel cell stack 110, and the membrane water content (λ) may be obtained based on the membrane resistance value in the set table.

The cathode inflow water amount determining portion 211 references the electro-osmotic coefficient table and obtains the electro-osmotic coefficient (β) based on the membrane water content (λ) obtained in step S210 (step S215). As shown in FIG. 5, the electro-osmotic coefficient (β) can be obtained based on the membrane water content (λ) according to the electro-osmotic coefficient table L20.

The cathode inflow water amount determining portion 211 then obtains the amount (Qe) of electro-osmotic water W1 according to Expression 6 below using the current density (i) obtained in step S205 and the electro-osmotic coefficient (β) obtained in step S215 (step S220). In Expression 6, "F" represents a Faraday constant. This constant may be stored in the constant storing portion 224 in advance. Incidentally, in Expression 6, "t" is a variable that indicates the period of time that has passed after the cathode inflow water (i.e., the water that flows into the cathode) starts to accumulate in the cathode side catalyst layer 13c due to frozen residual water (hereinafter, this period of time will simply be referred to as the "time after activation"). Therefore, according to Expression 6, the electro-osmotic water amount (Qe) can be obtained as a function of the time after activation "t". As shown in Expression 6, the electro-osmotic water amount (Qe) is proportionate to the time after activation "t". This is because the water continues to move with the movement of protons after the fuel cell stack 110 starts up.

$$Qe = i/F * \beta * t \quad \text{(Expression 6)}$$

Incidentally, when the fuel cell system 100 is activated in a temperature environment of below freezing, it is highly likely that residual water is already frozen, so water that flows into the cathode due to the frozen residual water may start to accumulate in the cathode side catalyst layer 13c simultaneously with activation. Therefore, in this example embodiment, the time after activation "t" represents the time that has passed after the fuel cell system 100 is activated.

The cathode inflow water amount determining portion 211 references the diffusion coefficient table and obtains the self-diffusion coefficient (D) of the water in the electrolyte membrane 12 based on the temperature (T) of the fuel cell stack 110 measured in step S105 and the membrane water content (λ) obtained in the step S210 (step S225). As shown in FIG. 4, the table to be referenced is set based on the temperature (T) of the fuel cell stack 110, and the self-diffusion coefficient (D) may be obtained based on the membrane water content (λ) in the set table.

The cathode inflow water amount determining portion 211 obtains the water concentration (Cw) of the cathode side catalyst layer 13c and the water concentration (Cw) of the anode side catalyst layer 13a using Expression 7 below, based on the membrane water content (λ) obtained in step S210, and then obtains the water concentration difference (ΔC) of both electrodes by subtracting the water concentration on the anode side from the water concentration on the cathode side (step S230).

$$Cw = \epsilon * \rho * \lambda / EW \quad \text{(Expression 7)}$$

In Expression 7, "ε" is a constant that represents the volume of the ionomer (the volume fraction of the ionomer) per unit volume of the catalyst layer of each electrode, and "ρ" is a constant that represents the weight of the ionomer (i.e., the ionomer density) per unit volume of the catalyst layer of each electrode. Also, "EW" in Expression 7 is a constant that represents the density (i.e., the acid group density) of a side chain having a sulfonic acid group of the ionomer. These constants "ε", "ρ", and "EW" may be stored in the constant storing portion 224 in advance. Incidentally, the membrane water content (λ) must be obtained for both the cathode side catalyst layer 13c and the anode side catalyst layer 13a, but in this example embodiment, the membrane water content of the electrolyte membrane 12 obtained in step S210 is used as the membrane water content of both the cathode side catalyst layer 13c and the anode side catalyst layer 13a.

The cathode inflow water amount determining portion 211 obtains the amount of back-diffusion water W2 (i.e., the back-diffusion water amount Qi) using Expression 8 below, based on the self-diffusion coefficient (D) obtained in step S225 and the water concentration difference (ΔC) obtained in step S230 (step S235). In Expression 8, "Δmt" is a constant that represents the thickness of the electrolyte membrane 12 in the stacking direction. This constant "Δmt" may be stored in the constant storing portion 224 in advance. Incidentally, in Expression 8, "t" is a variable that represents the time after activation. Therefore, the back-diffusion water amount (Qi) may be obtained as a function of the time after activation "t", similar to the electro-osmotic water amount (Qe). As shown in Expression 8, the back-diffusion water amount (Qi) is proportionate to the time "t". This is because the water continuously flows based on the water concentration difference (i.e., the difference in the water vapor partial pressure) between the electrodes after activation of the fuel cell stack 110.

$$Qi = D * \Delta C / \Delta mt * t \quad \text{(Expression 8)}$$

The cathode inflow water amount determining portion 211 obtains the cathode inflow water amount (Qc) by subtracting the back-diffusion water amount (Qi) calculated in step S235 from the electro-osmotic water amount (Qe) calculated in step S220 (step S240). The electro-osmotic water amount (Qe) and the back-diffusion water amount (Qi) are both functions of the time after activation "t", so the cathode inflow water amount (Qc) may be obtained as a function of the time after activation "t" in step S240.

Returning to FIG. 6, after step S130 is executed, the operating condition determining portion 212 obtains the total volume (Vc) of the pores in the cathode side catalyst layer 13c (step S135). The total volume of the pores may be obtained in advance through testing and stored in the constant storing portion 224. A mercury intrusion technique, for example, may be used as the method by which to measure the total volume of the pores.

If the electro-osmotic water amount (Qe) is greater than the back-diffusion water amount (Qi), then the total amount of water (i.e., the cathode inflow water amount Qc) that flows into the pores in the cathode side catalyst layer 13c increases over time after activation of the fuel cell stack 110.

Using Expression 9 below, the operating condition determining portion 212 then obtains the time (hereinafter referred to as the "time limit") tL until the cathode inflow water amount (Qc) that is obtained in step S130 reaches the total volume (Vc) of the pores in the cathode side catalyst layer 13c (step S140).

$$(i/F*\beta - \epsilon*\rho*\lambda/EW)t = Vc \quad \text{(Expression 9)}$$

Once the time limit tL is obtained, the time measuring portion 215 measures the time after activation tn (step S145). The cathode inflow water amount determining portion 211 then determines whether the time after activation tn has reached the time limit tL (step S150). If the time after activation tn has not reached the time limit tL (i.e., tn<tL), the process returns to step S105. If, on the other hand, the time after activation tn has reached the time limit tL (i.e., tn≧tL), the current adjusting portion 213 decreases the current value of the current that flows through the fuel cell stack 110 (step S155). More specifically, the current adjusting portion 213 decreases the required current value by a predetermined amount from the current value measured by the current measuring portion 71, regardless of the depression amount of the accelerator pedal 30. This decreased amount may be, for example a fixed amount (such as 1 A) or a fixed percentage (such as 20%).

Figure 8:
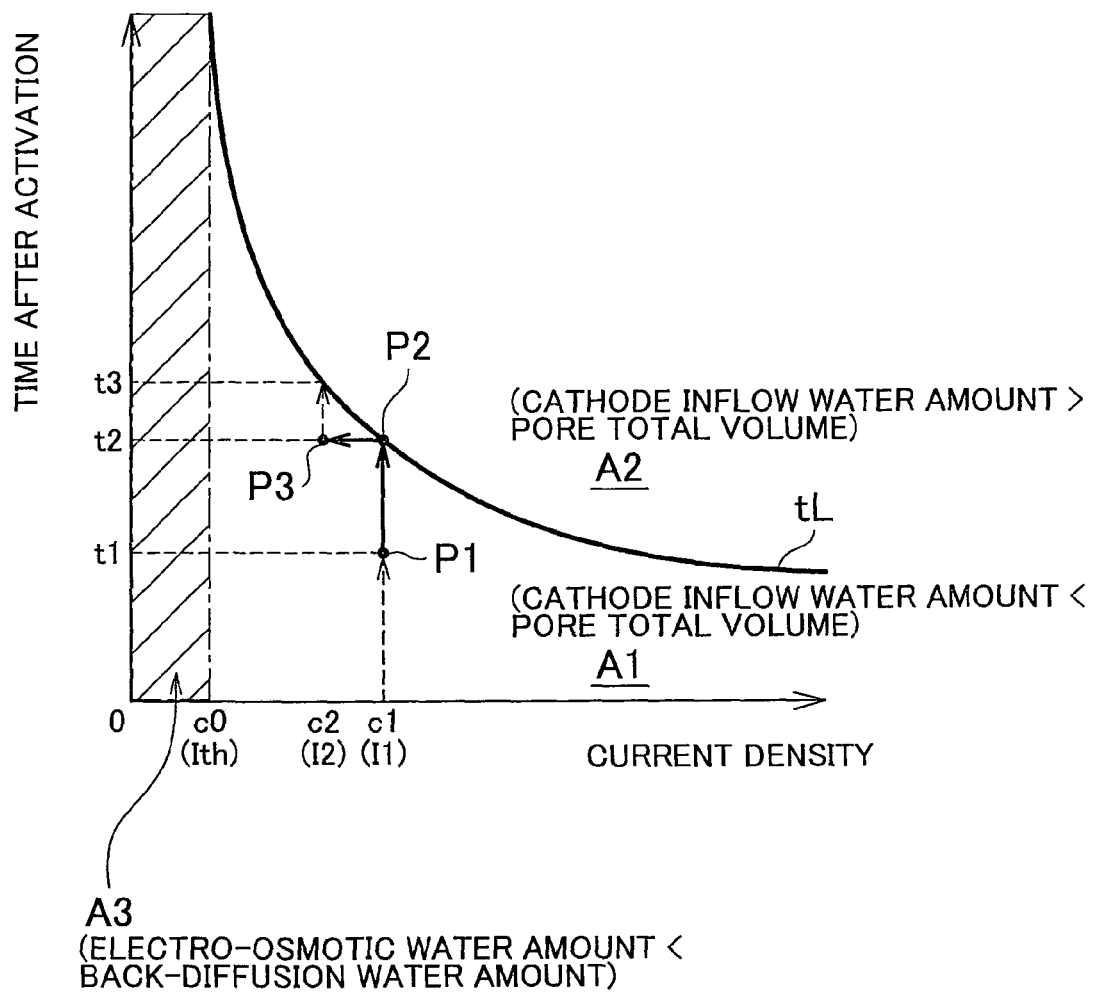
FIG. 8 is a view of one example of a time limit when the startup routine is being executed.

FIG. 8 is a view of one example of the time limit tL when the startup routine is executed. In FIG. 8, the horizontal axis represents the current density (i) and the vertical axis represents the time after activation (t). As shown in FIG. 8, the time limit tL changes according to the current density (i). More specifically, the value of the time limit tL becomes smaller as the current density increases. This is because the electro-osmotic water amount (Qe) increases as the current density increases, so the cathode inflow water amount (Qc) reaches the pore total volume (Vc) in a shorter time.

In FIG. 8, region A1 below the time limit tL indicates a state in which the cathode inflow water amount is less than the pore total volume, and region A2 above the time limit tL indicates a state in which the cathode inflow water amount is greater than the pore total volume. In region A2 above the time limit tL, the cathode inflow water amount is greater than the pore total volume, the pores are not able to hold (i.e., retain) all of the cathode inflow water, and as a result, the cathode inflow water spills out between the electrolyte membrane 12 and the cathode side catalyst layer 13c. The region A1 has a region A3 that will not reach the time limit tL no matter how long the time after activation is. This region A3 indicates a state in which water will not accumulate in the cathode side catalyst layer 13c because the electro-osmotic water amount (Qe) is less than the back-diffusion water amount (Qi). In region A3 in FIG. 8, the current density is c0 or less. Incidentally, the current value at this time will be referred to as the threshold current value Ith. The state of region A3 is one in which water will not accumulate in the cathode side catalyst layer 13c, but the current value of the fuel cell stack 110 is a current of equal to or less than a relatively low threshold current value Ith, and the power generating performance of the fuel cell stack 110 is low. Therefore, for example, an electric vehicle will be slow to accelerate even if the accelerator is depressed.

Now, the detailed operation when the startup routine described above will be described with reference to FIG. 8. For example, when the operating point is operating point P1 in which the time after activation tn is t1 (<tL) as a result of executing steps S105 to S145, while the current density is c1 (current value I1), it is determined in step S150 that the time limit tL has not been reached, so steps S105 to S145 are executed again. In this case, the current value I1 does not change. Then after steps S105 to S145 are executed, step S155 is executed and the current value changes from I1 to I2 (current density c2) when operating point P2 in which the time after activation tn is t2 (=tL) is reached. In this case, as shown in FIG. 8, the time limit tL at the current value I2 is t3 that is longer than t2, and the operating point P2 is within region A1. The reason that the time limit tL increases from t2 to t3 in this way is because the back-diffusion water amount relatively increases due to the decrease in the electro-osmotic water amount that is caused by the decrease in the current value, and as a result, water is discharged to the anode side from the pores in the cathode side catalyst layer 13c.

As is evident from the example shown in FIG. 8, in this example embodiment, when decreasing the current value in step S155, the current value is decreased within a range in which the current value after the decrease exceeds the threshold current value Ith. More specifically, the threshold current value Ith is obtained through testing or the like in advance, and the current value is decreased by a predetermined amount or a predetermined percentage so as to exceed this threshold current value Ith. This is done in order to minimize an extreme decline in power generating performance of the fuel cell stack 110 due to the current value being decreased to an extremely low value that is equal to or less than the threshold current value Ith.

As described above, the fuel cell system 100 determines whether the cathode inflow water amount exceeds the pore total volume of the cathode side catalyst layer 13c. If the cathode inflow water amount is equal to or greater than the pore total volume, Water is discharged from the cathode side catalyst layer 13c to the anode side by decreasing the current that flows through the fuel cell stack 110. As a result, it is possible to inhibit water that has overflowed from the cathode side catalyst layer 13c from always being between the cathode side catalyst layer 13c and the electrolyte membrane 12. Accordingly, it is possible to inhibit the cathode side catalyst layer 13c from separating from the electrolyte membrane 12 due to the freezing of water that has accumulated between the electrolyte membrane 12 and the cathode side catalyst layer 13c.

In addition, normal operation is performed when the temperature of the fuel cell stack 110 is equal to or above 0° C. and none of the fuel cells 10 are in a blocked state due to frozen residual water. Therefore, steps S115 to S155 do not have to be executed, so the processing load on the control unit 20 can be reduced. Similarly, it is determined whether any of the fuel cells 10 are blocked and if there are no blocked fuel cells 10, steps S130 to S155 are not executed, so the processing load on the control unit 20 can be reduced.

Also, the cathode inflow water amount and the back-diffusion water amount are obtained, and the cathode inflow water amount is obtained based on these water amounts, so the cathode inflow water amount is able to be obtained more accurately than it can with a structure in which the cathode inflow water amount is estimated. Therefore, control of the cathode inflow water amount such that water will not accumulate between the cathode side catalyst layer 13c and the electrolyte membrane 12 can be accurately performed.

Also, the current value (i.e., the required current value) is decreased such that the current value after the decrease will exceed the threshold current value Ith. As a result, an extreme decline in the power generating performance of the fuel cell stack 110 is able to be suppressed.

B. Second Example Embodiment

Figure 9:
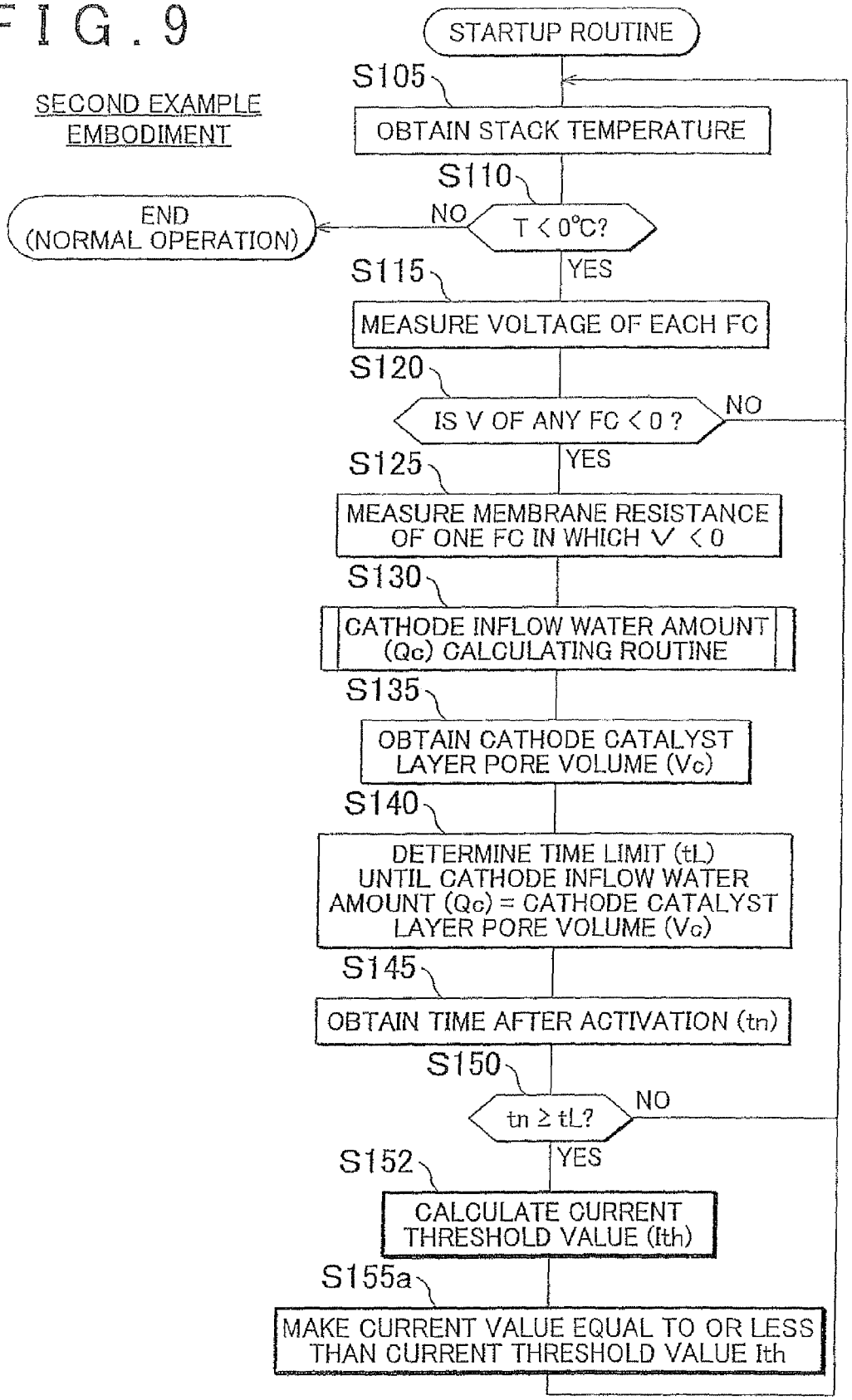
FIG. 9 is a flowchart illustrating a startup routine according to a second example embodiment of the invention.

FIG. 9 is a flowchart illustrating a startup routine according to a second example embodiment of the invention. The fuel cell system 100 according to this second example embodiment differs from the fuel cell system 100 according to the first example embodiment in that in the startup routine, step S152 has been added, and step S155a is executed instead of step S155. The other structure of the fuel cell system 100 according to the second example embodiment is the same as the structure of the fuel cell system 100 according to the first example embodiment.

When the time after activation tn reaches the time limit tL (i.e., to tn≧tL) as a result of step S150 in FIG. 9, the operating condition determining portion 212 calculates the threshold current value (Ith) (step S152). The threshold current value (Ith) is the same as the threshold current value Ith shown in FIG. 8. The threshold current value (Ith) is calculated by obtaining the current density (i) according to Expression 10 below that indicates that the electro-osmotic water amount (Qe) and the back-diffusion water amount (Qi) are equal, and then multiplying the area of the laminating surface (i.e., the stacking surface) of the electrolyte membrane 12 by the obtained current density (i).

$$i/F*\beta*t = D*\Delta C/\Delta mt*t \quad \text{(Expression 10)}$$

After calculating the threshold current value (Ith), the operating condition determining portion 212 decreases the current value to equal to or less than the threshold current value (Ith) (step S155a).

Figure 10:
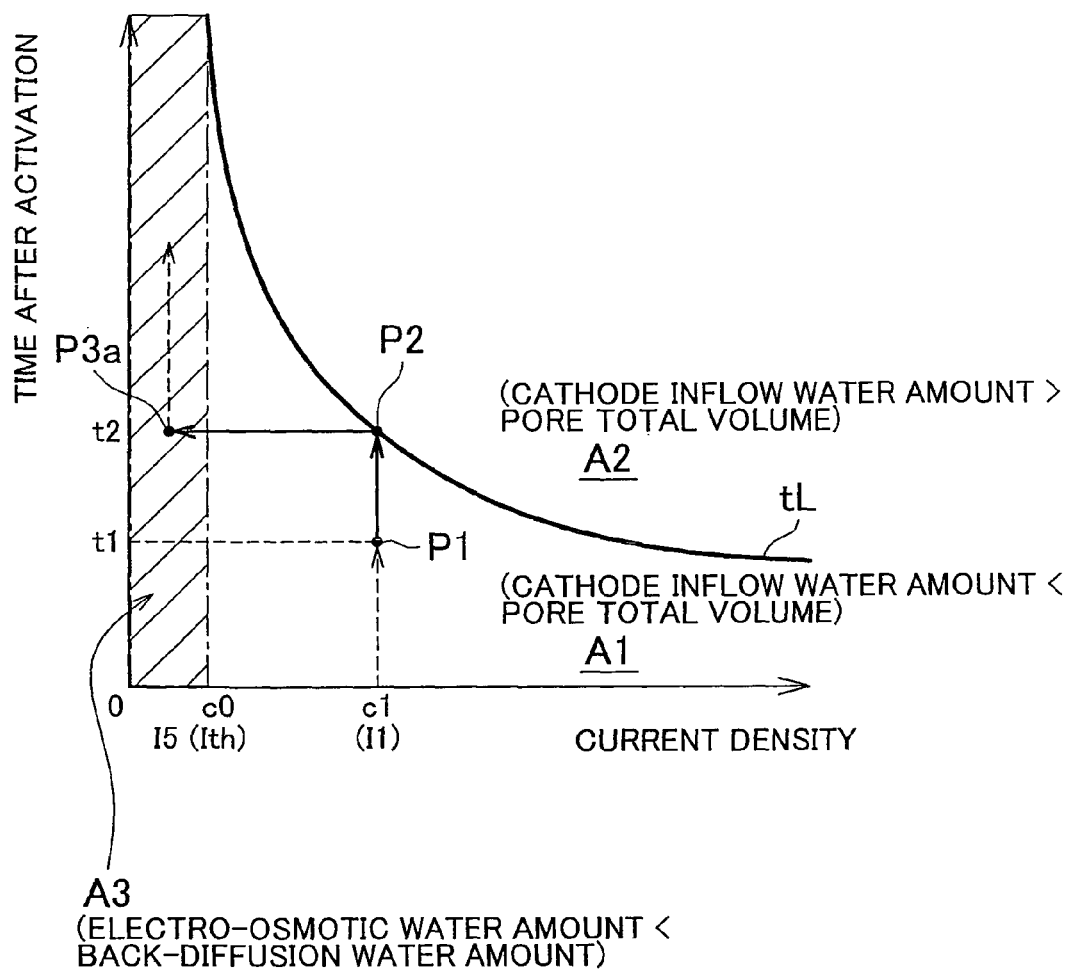
FIG. 10 is a graph of a change in the operating point in the second example embodiment.

FIG. 10 is a graph of a change in the operating point in the second example embodiment. The horizontal axis and the vertical axis in FIG. 10 are the same as those in FIG. 8. In this second example embodiment, when the operating point is the operating point P2, the time after activation to is equal to or greater than the time limit tL (i.e., tn tL), so step S152 is executed and the threshold current value Ith is obtained. Then the current value is decreased to 15 (<Ith) and the operating point shifts to the operating point P3a within region A3. As described above, region A3 indicates a state (i.e., a region) in which the cathode inflow water amount will not exceed the pore total volume regardless of the length of time after activation. Therefore, it is possible to inhibit cathode inflow water from overflowing from the pores and accumulating between the cathode side catalyst layer 13c and the electrolyte membrane 12 thereafter.

The fuel cell system 100 according to the second example embodiment that has the structure described above has the same effects as the fuel cell system 100 according to the first example embodiment. In addition, step S155a is executed only once so the process for obtaining the current value after the decrease does not need to be repeated. As a result, the processing load on the control unit 20 can be reduced.

C. Third Example Embodiment

Figure 11:
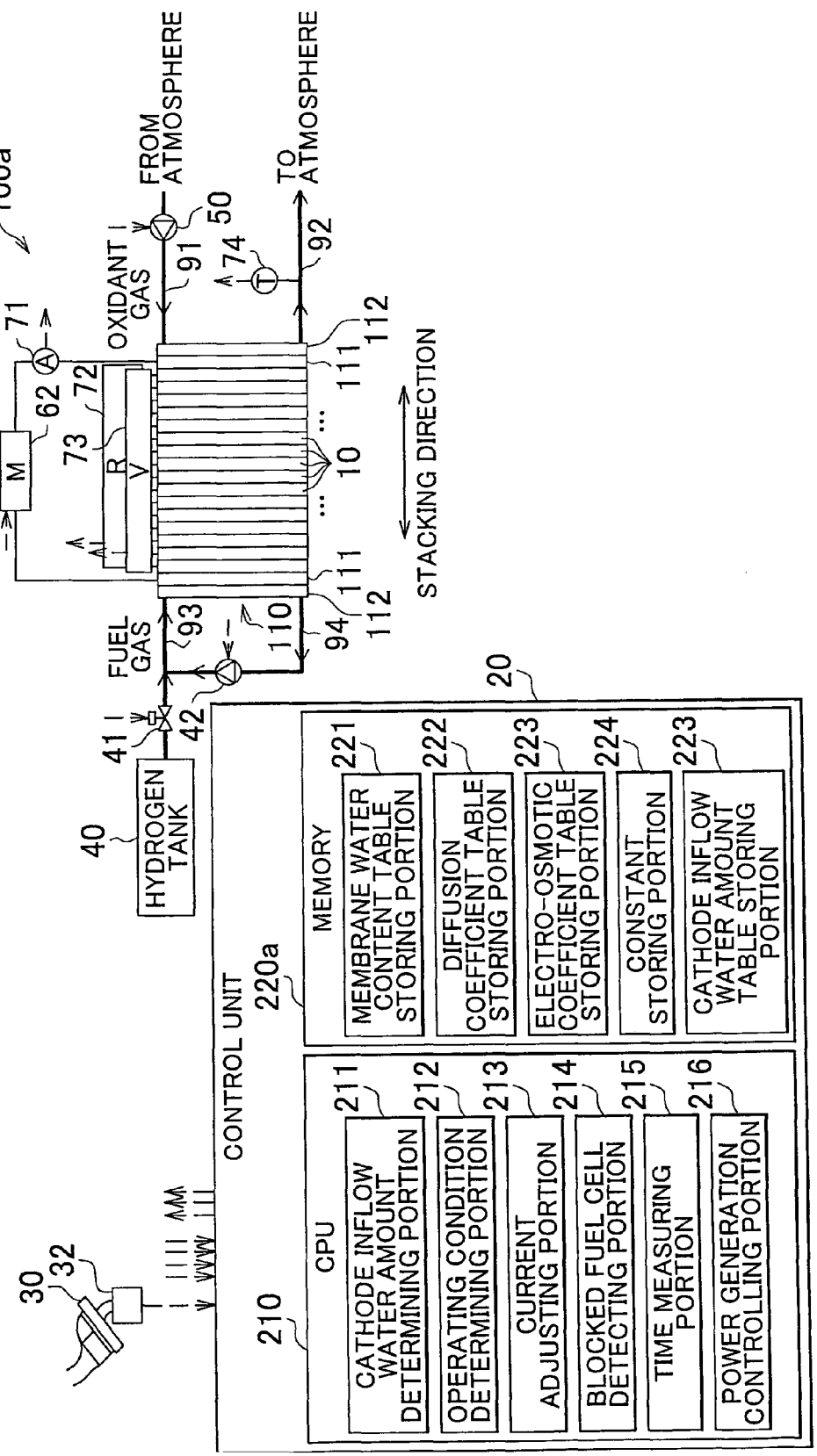
FIG. 11 is a diagram of the general structure of a fuel cell system according to a third example embodiment of the invention.
Figure 12:
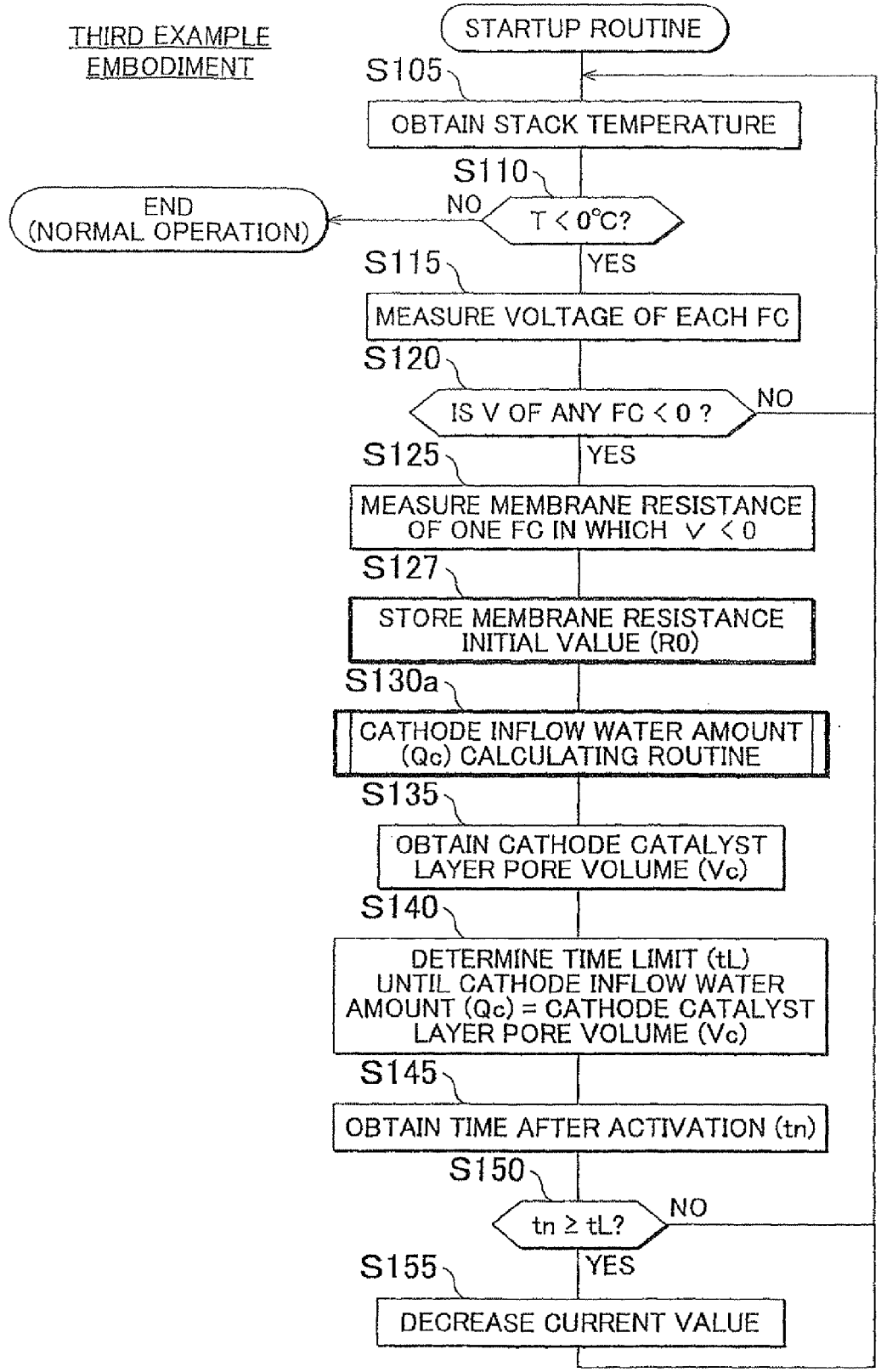
FIG. 12 is a flowchart illustrating a startup routine according to the third example embodiment.
Figure 13:
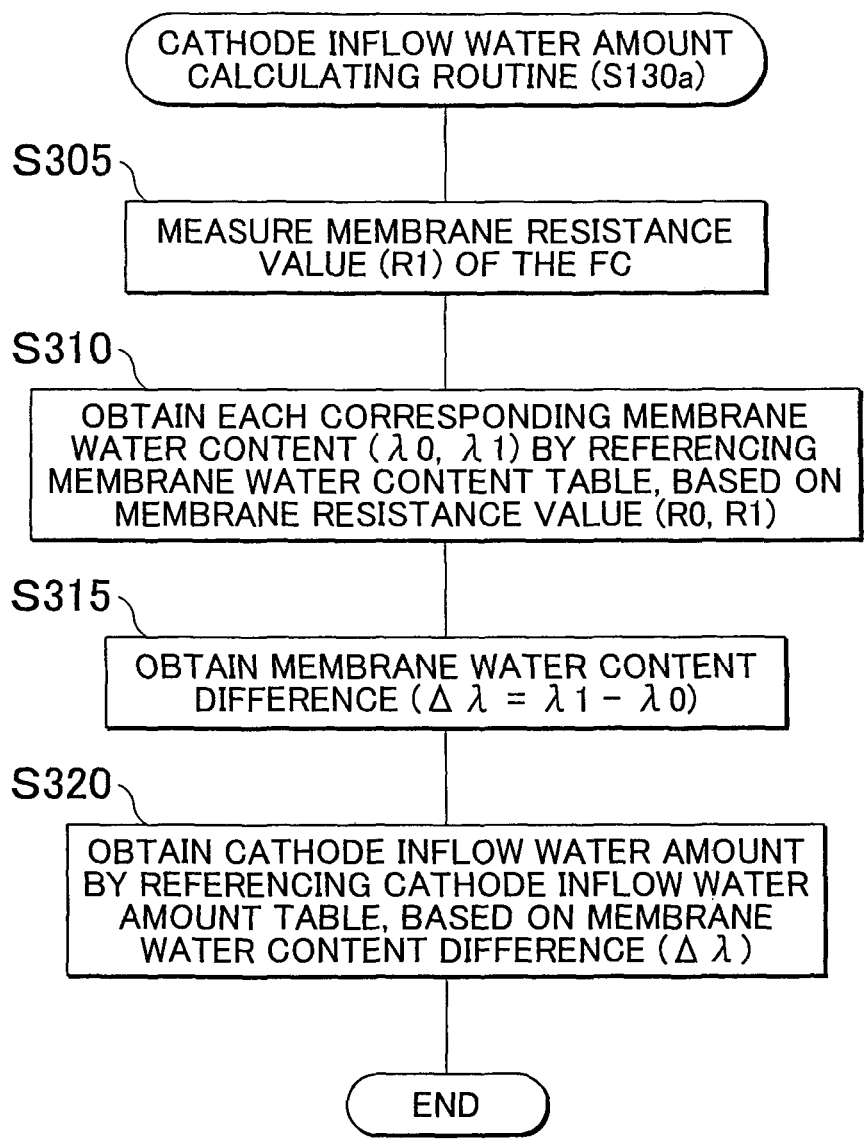
FIG. 13 is a flowchart illustrating a cathode inflow water amount calculating routine in the third example embodiment.

FIG. 11 is a diagram of the general structure of a fuel cell system 100a according to a third example embodiment of the invention. FIG. 12 is a flowchart illustrating a startup routine according to the third example embodiment. FIG. 13 is a flowchart illustrating a cathode inflow water amount calculating routine in the third example embodiment. The fuel cell system 100a according to the third example embodiment differs from the fuel cell system 100 according to the first example embodiment in that memory 220a includes a cathode inflow water amount table storing portion 225, step S127 is added in the startup routine, and the cathode inflow water amount is obtained based on the cathode inflow water amount table in a cathode inflow water amount calculating routine. The other structure is the same as in the first example embodiment.

Figure 14:
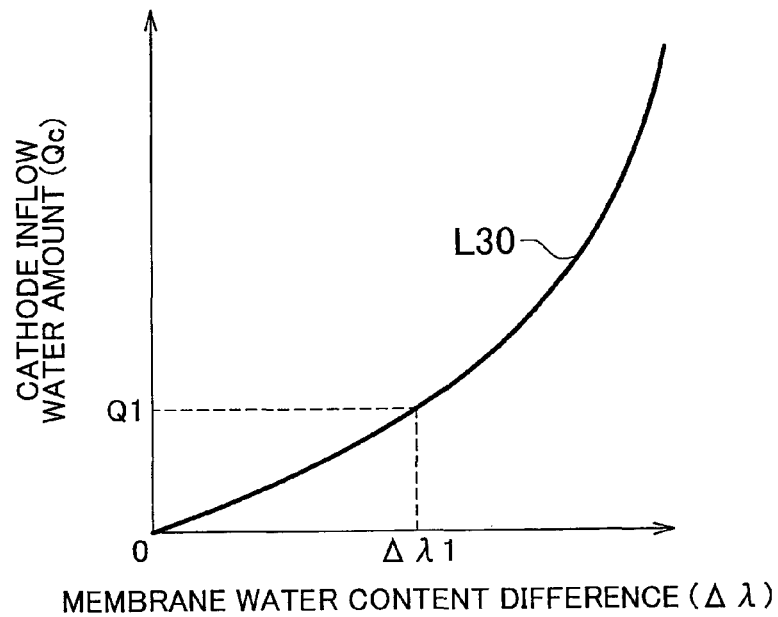
FIG. 14 is a view showing a frame format of a cathode inflow water amount table stored in a cathode inflow water amount table storing portion shown in FIG. 11.

FIG. 14 is a view showing a frame format of the cathode inflow water amount table stored in the cathode inflow water amount table storing portion 225 shown in FIG. 11. In FIG. 14, the horizontal axis represents a membrane water content difference ($\lambda 1$) and the vertical axis represents the cathode inflow water amount (Qc). The membrane water content difference refers to the difference between the membrane water content immediately after the start of the startup routine and the membrane water content at an arbitrary time after the start of the startup routine. The cathode inflow water amount table is a table that correlates the difference in the membrane water content ($\lambda$) with the cathode inflow water amount (Qc). In FIG. 14, a cathode inflow water amount table L30 is shown representatively as a curve (with continuous values being set), but it may also be set to discrete values.

Typically, the membrane water content ($\lambda$) increases as the electrolyte membrane 12 becomes wetter. Therefore, the membrane water content ($\lambda$) increases as the electrolyte membrane 12 changes from dry to wet by the activation of the fuel cell system 100a. At this time, the cathode inflow water amount (i.e., the total amount of water) also increases as the electrolyte membrane 12 changes from dry to wet. Therefore, the cathode inflow water amount also increases as the difference in the membrane water content increases, as shown in FIG. 14. Incidentally, the corresponding relationship between the membrane water content difference and the cathode inflow water amount may be obtained through testing in advance, made into a cathode inflow water amount table, and stored in the cathode inflow water amount table storing portion 225.

As shown in FIG. 12, after measuring the membrane resistance of the fuel cell 10 in step S125, the operating condition determining portion 212 references the membrane water content table and obtains the membrane water content ($\lambda 0$) of the initial state based on the obtained membrane resistance value, and then stores the obtained membrane water content ($\lambda 0$) in the memory 220a (step S127). Incidentally, step S127 is executed only once immediately after the start of the startup routine and is omitted thereafter.

As shown in FIG. 13, the cathode inflow water amount determining portion 211 measures the membrane resistance value again for the fuel cell 10 for which the membrane resistance had been measured in step S125, and stores the membrane resistance value (R1) in the memory 220a (step S305). The cathode inflow water amount determining portion 211 then references the membrane water content table and obtains the membrane water content ($\lambda 0$) corresponding to the membrane resistance value based on the membrane resistance value (R0) of the initial state obtained in step S125 and obtains the membrane water content ($\lambda 1$) corresponding to the membrane resistance value based on the membrane resistance value (R1) obtained in step S305 (step S310). The cathode inflow water amount determining portion 211 then obtains the difference ($\Delta\lambda$) between the two membrane water contents ($\lambda 0$ and $\lambda 1$) obtained in step S310 (step S315).

Figure 15:
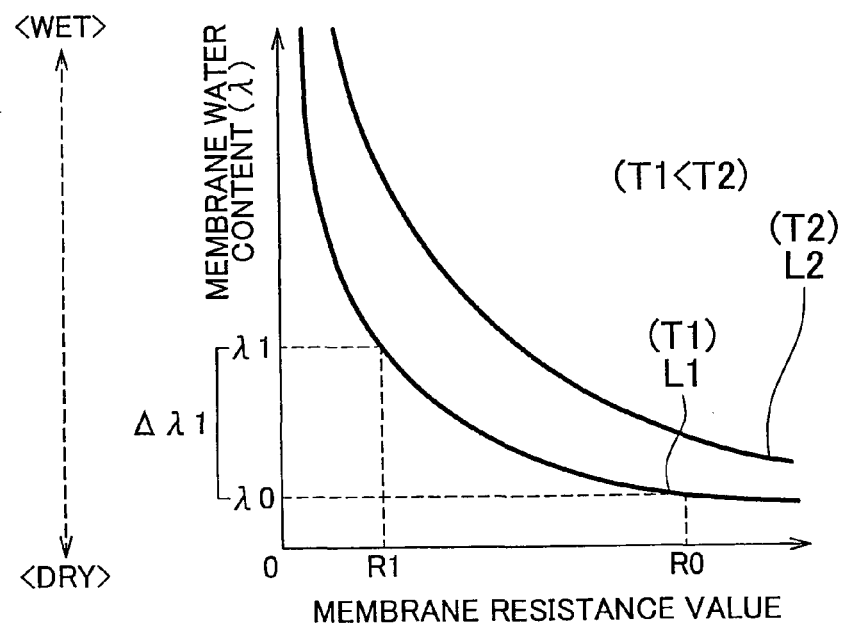
FIG. 15 is a view of a method of obtaining a membrane water content difference in step S315 in the third example embodiment.

FIG. 15 is a view of a method of obtaining the membrane water content difference ($\Delta\lambda$) in step S315 of the third example embodiment. In FIG. 15, the horizontal axis, the vertical axis, and tables L1 and L2 are the same as they are in FIG. 3.

As shown in FIG. 15, the membrane water content $\lambda 0$ is obtained by referencing table L1, as the membrane water content that corresponds to the membrane resistance value (R0) of the initial state obtained in step S125. Then when the membrane resistance value R1 is measured in step S305 when the humidity of the electrolyte membrane 12 has increased, and thus the membrane resistance value has decreased, due to the activation of the fuel cell system 100a, a membrane water content $\lambda 1$ that is a larger value than the membrane water content $\lambda 0$ is obtained as the membrane water content that corresponds to the membrane resistance value R1. Accordingly, in step S315, the membrane water content difference Δλ1 is obtained by subtracting the membrane water content λ0 from the membrane water content λ1.

Once the membrane water content difference (Δλ) is obtained, the cathode inflow water amount determining portion 211 references the cathode inflow amount table and obtains the cathode inflow water amount (Qc) based on the membrane water content difference (Δλ) obtained in step S315 (step S320). As shown in FIG. 14, when the membrane water content difference Δλ1 is obtained, the cathode inflow water amount Q1 may be obtained by referencing the table L30 based on this membrane water content difference Δλ1.

The fuel cell system 100a according to the third example embodiment that has the structure described above has the same effects as the fuel cell system 100 according to the first example embodiment. In addition, the cathode inflow water amount (Qc) is obtained based on the membrane water content difference that is obtained from the change in the membrane resistance value, by referencing the cathode inflow water amount table. As a result, it is no longer necessary to perform a calculation to obtain the cathode inflow water amount, which enables the processing load on the control unit 20 to be reduced.

D. MODIFIED EXAMPLES

The invention is not limited to the example embodiments described above. That is, the invention may also be carried out in modes that have been modified or improved in various ways without departing from the scope thereof. For example, the following modifications are also possible.

D1. First Modified Example

In order to obtain the cathode inflow water amount, in the first and second example embodiments, the electro-osmotic water amount (Qe) and the back-diffusion water amount (Qi) are both calculated and the cathode inflow water amount is calculated based on these. Also, in the third example embodiment, the membrane water content difference is obtained from the change in the membrane resistance value, and the cathode inflow water amount is obtained based on this membrane water content difference by referencing the cathode inflow water amount table. However, the invention is not limited to these examples. For example, the cathode inflow water amount may also be obtained based on a change in the dimensions of the electrolyte membrane 12.

The volume (i.e., dimensions) of the electrolyte membrane 12 decreases as water moves from the electrolyte membrane 12 to the cathode side catalyst layer 13c. Therefore, the corresponding relationship between the dimensions of the electrolyte membrane 12 and the cathode inflow water amount may be obtained through testing beforehand and stored in the memory 220 or 220a as a table. Then the dimensions of the electrolyte membrane 12 may be measured and the cathode inflow water amount may be obtained based on the obtained dimensions by referencing the table. The change in the dimensions of each fuel cell 10 may be measured using a strain gauge, for example, and the dimensions of the electrolyte membrane 12 may be obtained based on the obtained change in dimensions.

Also, for example, the cathode inflow water amount may be obtained based on the amount of hydrogen produced in the cathode side catalyst layer 13c. As shown in Expression 5 above, the amount of hydrogen produced in the cathode side catalyst layer 13c increases as more protons move. Also, the electro-osmotic water amount (Qe) also increases as more protons move. Therefore, the cathode inflow water amount increases as the amount of hydrogen produced in the cathode side catalyst layer 13c increases. Thus, the corresponding relationship between the amount of hydrogen produced and the cathode inflow water amount may be obtained through testing beforehand and stored in the memory 220 or 220a as a table. Then the amount of hydrogen produced may be measured and the cathode inflow water amount may be obtained based on the amount of hydrogen produced, by referencing the table. Alternatively, a sensor that detects the amount of hydrogen may also be provided in the oxidant gas discharge line 92, and the amount of hydrogen may be measured using this sensor.

D2. Second Modified Example

In the example embodiments described above, the voltage value of each fuel cell 10 is measured using the voltage measuring portion 73 in order to determine whether there is a fuel cell 10 that is in a blocked state. However, the invention is not limited to this. More specifically, for example, the following structure may be used. Instead of the voltage measuring portion 73, a voltage measuring portion capable of measuring the voltage of a plurality of adjacent fuel cells 10 (hereinafter referred to as a "fuel cell group") may be provided, the fuel cell stack 110 may be divided into a plurality of fuel cell groups each made up of the same number of fuel cells, and the voltage of each fuel cell group may be measured. Then the voltage of one fuel cell group is compared with the voltage of another fuel cell group, and if the voltage of a fuel cell group is lower by a predetermined amount, it may be determined that the fuel cell group includes a fuel cell 10 in a blocked state. With this kind of structure it is not necessary to determine whether the state of the fuel cell 10 is a blocked state for each fuel cell 10, so whether there is a fuel cell 10 in a blocked state can be determined in a short period of time.

D3. Third Modified Example

In the example embodiments described above, whether any of the fuel cells 10 is in a blocked state is determined by determining whether the voltage of each fuel cell 10 is a value lower than 0 V in the startup routine. Alternatively, however, instead of 0 V, an appropriate voltage value may also be used. For example, it may also be determined that a fuel cell 10 is in a blocked state if the voltage of the fuel cell 10 is lower than 0.5 V. Also, steps S115 and S120 (i.e., the step of obtaining the voltage value and the step of determining whether there is a fuel cell that is in a blocked state according to the voltage value) in the startup routine may also be omitted. More specifically, the step of measuring the voltage of each fuel cell 10 (step S115) and the step of determining whether there is a fuel cell 10 in a blocked state (step S120) may be omitted under the assumption that there is a fuel cell 10 in a blocked state if the temperature of the fuel cell stack 110 is below 0° C. This kind of structure enables the startup routine to be simplified, thereby reducing the processing load on the control unit 20. In addition, the voltage measuring portion 73 is able to be omitted, so the manufacturing cost of the fuel cell system 100 can also be reduced.

D4. Fourth Modified Example

In the first and second modified examples, the membrane water content (λ) is obtained by referencing the membrane water content table, based on the measured membrane resistance value. Instead, however, a constant may be set in advance as the membrane water content and stored in the memory 220, and the membrane water content (λ) may be obtained by reading this constant from the memory 220. For example, a value of "8" may be set as the membrane water content (λ) used when referencing the diffusion coefficient table and the electro-osmotic coefficient table, and as the membrane water content used in Expression 7 (an expression for obtaining the water concentration of both electrodes), a value of "2" may be set as the anode side membrane water content and a value of "14" may be set as the cathode side membrane water content. With this kind of structure, when obtaining the water concentrations of both the cathode side catalyst layer 13c and the anode side catalyst layer 13a, a value near the actual measured value that takes into account the characteristics of each electrode (i.e., the anode side is dry and the cathode side is wet) may be used instead of the membrane water content (λ) of the electrolyte membrane 12, as the membrane water content. Therefore, the water concentration is able to be more accurately obtained. In addition, the processing load on the control unit 20 can be reduced and the impedance measuring portion 72 can be omitted, so the manufacturing cost of the fuel cell system 100 can also be reduced. Incidentally, the membrane water contents set as the constants are not limited to the values given above. That is, any appropriate value may be set. However, the anode side is dry and the cathode side is wet, so the membrane water content of each electrode is preferably set such that the anode side membrane water content is within a range that is smaller than the cathode side membrane water content.

D5. Fifth Modified Example

The value set in advance as a constant in the first and second example embodiments may be a variable instead of a constant. For example, the pore total volume (Vc) may also be a variable. The carbon particles that make up the cathode side catalyst layer 13c may degrade over time from oxidation. More specifically, the carbon particles (i.e., the secondary particles) may corrode from the produced water and bind together, and as a result, the spaces (i.e., pores) between the carbon particles may disappear. Therefore, a value that differs according to the time that has passed after the fuel cell system 100 is installed (i.e., a smaller value as the time that passes increases) may be set in advance, the time that passes may be obtained in step S135, and the pore total volume according to the obtained time that passes may be obtained as the pore total volume.

Figure 16:
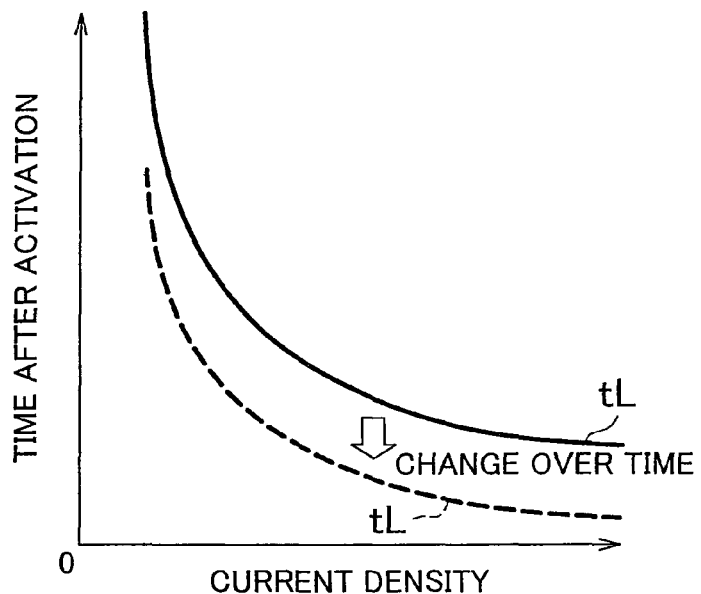
FIG. 16 is a view of first example of a time limit in a fifth modified example.

FIG. 16 is a view of first example of a time limit in a fifth modified example. The horizontal axis and the vertical axis in FIG. 16 are the same as those in FIG. 8. As described above, the pore total volume gradually decreases due to oxidation of the carbon particles of the cathode side catalyst layer 13c, so the time limit tL at the same current density will gradually become shorter.

Also, for example, the thickness Δmt of the electrolyte membrane 12 may be a variable. The main chain of the ionomer that forms the electrolyte membrane 12 is gradually cut by hydrogen peroxide. Also, compression force to fasten the fuel cells 10 is constantly applied to the electrolyte membrane 12. The thickness of the electrolyte membrane 12 gradually becomes thinner as the operating period becomes longer, due to the chemical and mechanical operation of these. Therefore, a value that differs according to the time that passes after the fuel cell system 100 is installed (i.e., a smaller value as the time that passes increases) may be set in advance, the time that passes may be obtained in step S235, and the thickness Δtm according to the obtained time that passes may be obtained as the thickness Δmt of the electrolyte membrane 12.

Figure 17:
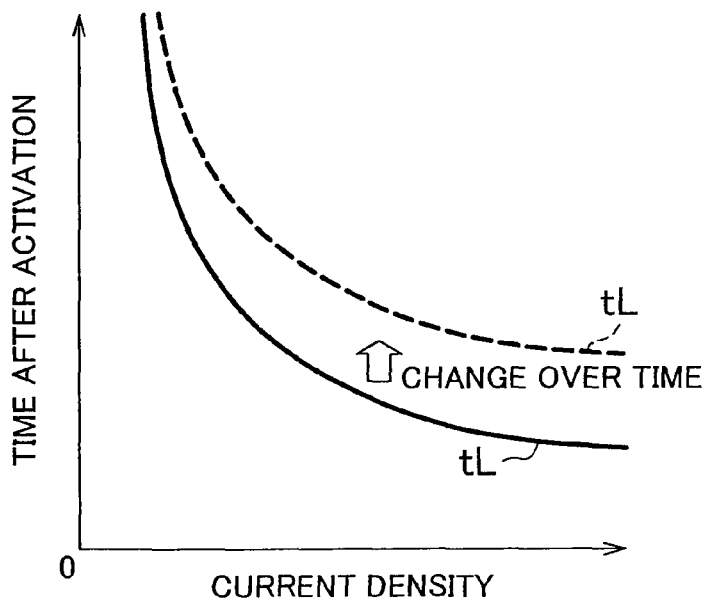
FIG. 17 is a view of a second example of a time limit in the fifth modified example.

FIG. 17 is a view of a second example of a time limit tL in the fifth modified example. The horizontal axis and the vertical axis in FIG. 17 are the same as those in FIG. 8. The thickness Δmt of the electrolyte membrane 12 gradually decreases (i.e., becomes thinner) as the period of use increases, so the back-diffusion water amount Qi gradually increases, as is evident from Expression 8 above. Therefore, the cathode inflow water amount Qc gradually decreases, and the time limit tL at the same current density gradually increases, as shown in FIG. 17.

D6. Sixth Modified Example

In the first and second example embodiments, a plurality of diffusion coefficient tables are set according to the temperature, as shown in FIG. 4. However, a plurality of diffusion coefficient tables may also be set according to the time that passes after the fuel cell system 100 is installed, in addition to the temperature. More impurities may become mixed in with the electrolyte membrane 12 as the operating period becomes longer. As a result, the self-diffusion coefficient (D) of the electrolyte membrane 12 gradually decreases. Therefore, diffusion coefficient tables that differ depending on the time that passes after the fuel cell system 100 is installed may be set in advance, the time that has passed may be obtained in step S225, and the self-diffusion coefficient (D) may be obtained by referencing the diffusion coefficient table according to the obtained time that has passed. In this case, the self-diffusion coefficient (D) gradually decreases, so the back-diffusion water amount Qi gradually decreases, as is evident from Expression 8 above. Therefore, the cathode inflow water amount Qc gradually increases, and the time limit tL at the same current density gradually becomes shorter, just as in FIG. 16 described above.

D7. Seventh Modified Example

In the example embodiments described above, the time after activation obtained in step S145 is the period of time that has passed after the fuel cell system 100 is activated. Instead, however, the time after activation may be the period of time that has passed after it is determined in step S120 that the voltage is lower than 0 in one of the fuel cells 10. With this kind of structure, if there is a fuel cell 10 that is blocked after the fuel cell system 100 is activated, it is possible to obtain the precise period of time that has passed after the blockage has occurred, so the cathode inflow water amount is able to be accurately obtained.

D8. Eighth Modified Example

In the example embodiments described above, it is determined whether the temperature of the fuel cell stack 110 is below 0° C., and if the temperature of the fuel cell stack 110 is below 0° C., steps S115 and thereafter are executed. Instead, however, steps S115 and thereafter may be executed regardless of the temperature of the fuel cell stack 110. In this case, the steps of obtaining the temperature of the fuel cell stack 110 (i.e., step S105) and making the determination (i.e., step S110) may be omitted. Even if the temperature of the fuel cell stack 110 is equal to or above 0° C., in a low temperature environment of near 0° C., residual water that has frozen may remain frozen instead of melting. Therefore, steps S130 and thereafter can be reliably executed when there is a blocked fuel cell 10 by executing steps S130 and thereafter according to whether there is a blocked fuel cell 10, regardless of the temperature of the fuel cell stack 110. Accordingly, the cathode side catalyst layer 13c can be reliably suppressed from separating from the electrolyte membrane 12. Incidentally, with this structure, the startup routine may end and normal operation may be performed after a predetermined period of time has passed after the fuel cell system 100 or 100a is activated, for example.

D9. Ninth Modified Example

In the example embodiments described above, the current value is decreased after the time after activation tn reaches the time limit tL. Instead, however, the current value may be decreased before the time after activation tn reaches the time limit tL. For example, the current value may be decreased when the time after activation tn reaches a time that is offset by a predetermined period of time from the time limit tL, for example. With this kind of structure, the time difference between a time point at which it is determined that the time after activation tn has reached the time limit tL and a time point at which the electro-osmotic water amount is actually decreased can be shortened, so it is possible to reliably suppress the cathode inflow water amount from exceeding the pore total volume.

D10. Tenth Modified Example

In the example embodiments described above, the fuel cell systems 100 and 100a are used mounted in an electric vehicle. Instead, however, the fuel cell systems 100 and 100a may also be applied to any of a variety of movable objects, such as a hybrid vehicle, a marine vessel, or a robot. Also, instead of being mounted in a movable object, the fuel cell systems 100 and 100a may be applied as stationary power supplies or portable power supplies.

D11. Eleventh Modified Example

In the example embodiments described above, when the time after activation tn exceeds the time limit tL, the current value is decreased (steps S155 and S155a). Instead, however, the current value may be increased. For example, the structure may be such that the current value is increased such that the operating point after the current value is increased is at least in region A1 in FIG. 8. This kind of structure makes it possible to suppress the cathode inflow water amount from exceeding the pore total volume, as well as enables the power generating portion of the fuel cell stack 110 to be improved.

D12. Twelfth Modified Example

In the example embodiments described above, some of the structure realized by software may be replaced with hardware. Also, the various functional portions may also be realized divided into even smaller functional portions. For example, the cathode inflow water amount determining portion 211 may also be configured to include an electro-osmotic water amount determining portion that determines the electro-osmotic water amount, and a back-diffusion water amount determining portion that determines the back-diffusion water amount.

The invention claimed is:
1. A fuel cell system comprising:
a fuel cell that has an electrolyte membrane, and a cathode side catalyst layer and an anode side catalyst layer that have a plurality of pores and are arranged contacting the electrolyte membrane;
a cathode inflow water amount determining portion that determines a cathode inflow water amount that is an amount of water produced with power generation of the fuel cell that flows into the cathode side catalyst layer via the electrolyte membrane after activation of the fuel cell;
a pore volume obtaining portion that obtains a pore total volume that is a volume of the plurality of pores in the cathode side catalyst layer;
an operating condition determining portion that determines, based on the determined cathode inflow water amount and the obtained pore total volume, an operating condition of the fuel cell that includes a current value of current that flows through the fuel cell and an upper limit value of a period of time for which the current flows through the fuel cell, for bringing the cathode inflow water amount within a range that is equal to or less than the pore total volume;
a current adjusting portion that adjusts the current value and the period of time for which current of the current value flows, such that the determined operating condition is realized; and
a temperature obtaining portion that obtains a temperature of the fuel cell,
wherein the current adjusting portion adjusts the current value and the period of time for which the current flows, such that the determined operating condition is realized, when the obtained temperature is below 0 ° C.

2. The fuel cell system according to claim 1, wherein a gas that includes hydrogen is supplied as an anode side reaction gas to the fuel cell; the cathode inflow water amount determining portion includes an electro-osmotic water amount determining portion that determines an electro-osmotic water amount that is an amount of water that moves from an anode side to a cathode side through the electrolyte membrane with the movement of hydrogen ions from the anode side to the cathode side of the electrolyte membrane, that flows into the cathode side catalyst layer after activation of the fuel cell; and a back-diffusion water amount determining portion that determines a back-diffusion water amount that is an amount of water that moves from the cathode side to the anode side through the electrolyte membrane according to a water concentration difference between the cathode side catalyst layer and the anode side catalyst layer, and that flows out from the cathode side catalyst layer after activation of the fuel cell; and the cathode inflow water amount determining portion determines the cathode inflow water amount by subtracting the back-diffusion water amount from the electro-osmotic water amount.

3. The fuel cell system according to claim 2, wherein the electro-osmotic water amount determining portion determines the electro-osmotic water amount using expression 1, $$Qe = i/F*\beta*t \qquad \text{(expression 1)}$$

where Qe represents an electro-osmotic water amount, i represents a current density, F represents a Faraday constant, β represents an electro-osmotic coefficient, and t represents a period of time after activation.

4. The fuel cell system according to claim 2, wherein cathode side catalyst layer has an ionomer including a sulfonic acid group; and the back-diffusion water amount determining portion obtains the water concentration difference between the cathode side catalyst layer and the anode side catalyst layer by obtaining a water concentration of the cathode side catalyst layer and a water concentration of the anode side catalyst layer using expression 2, and determines the back-diffusion water amount using expression 3, $$Cw = \epsilon * \rho * \lambda / EW \quad \text{(expression 2)}$$

where Cw represents a water concentration, $\epsilon$ represents a volume fraction of an ionomer, $\rho$ represents an ionomer density, $\lambda$ represents a membrane water content, and EW represents an acid group density, $$Qi = D * \Delta C / \Delta mt * t \quad \text{(expression 3)}$$

where Qi represents a back-diffusion water amount, D represents a self-diffusion coefficient, $\Delta C$ represents a water concentration difference, $\Delta mt$ represents a thickness of an electrolyte membrane, and t represents a period of time after activation.

5. The fuel cell system according to claim 4, further comprising:
a storing portion that stores a preset value as the membrane water content ($\lambda$) of the cathode side catalyst layer and a preset value as the membrane water content ($\lambda$) of the anode side catalyst layer.

6. The fuel cell according to claim 1, further comprising:
a current value measuring portion that measures the current value; and
a time measuring portion that measures a period of time that passes after activation of the fuel cell,
wherein the current adjusting portion decreases the current value before the measured period of time that passes reaches the upper limit value of the operating condition that corresponds to the measured current value.

7. The fuel cell system according to claim 1, wherein the operating condition is an operating condition in which the cathode inflow water amount is equal to or less than 0.

8. The fuel cell system according to claim 1, further comprising:
a blocked state detecting portion that detects whether the fuel cell is in a blocked state in which the fuel cell is unable to generate power,
wherein the current adjusting portion adjusts the current value and the period of time for which the current flows, such that the determined operating condition is realized, when it is detected that the fuel cell is in the blocked state.

9. The fuel cell system according to claim 8, further comprising:
a voltage measuring portion that measures a voltage in the fuel cell,
wherein the blocked state detecting portion detects that the fuel cell is in a blocked state when the measured voltage is below 0 V.

10. The fuel cell system according to claim 8, further comprising:
a voltage value comparing portion that compares a first voltage value that is a voltage value of a first fuel cell group made up of a plurality of the fuel cells with a second voltage value that is a voltage value of a second fuel cell group that is made up of the same number of the fuel cells as the first fuel cell group,
wherein the blocked state detecting portion detects that one of the fuel cells of the first fuel cell group is in the blocked state when the first voltage value is lower than the second voltage value.

11. A control method for a fuel cell system that includes a fuel cell that has an electrolyte membrane, and a cathode side catalyst layer and an anode side catalyst layer that have a plurality of pores and are arranged contacting the electrolyte membrane, comprising:
determining a cathode inflow water amount that is an amount of water produced with power generation of the fuel cell that flows into the cathode side catalyst layer via the electrolyte membrane after activation of the fuel cell;
obtaining a pore total volume that is a volume of the plurality of pores in the cathode side catalyst layer;
determining, based on the determined cathode inflow water amount and the obtained pore total volume, an operating condition of the fuel cell that includes a current value of current that flows through the fuel cell and an upper limit value of a period of time for which the current flows through the fuel cell, for bringing the cathode inflow water amount within a range that is equal to or less than the pore total volume; and
adjusting the current value and the period of time for which current of the current value flows, such that the determined operating condition is realized; and
obtaining a temperature of the fuel cell,
wherein the current value and the period of time, for which the current flows, are adjusted such that the determined operating condition is realized, when, the obtained temperature is below 0° C.

* * * * *